L
United States Patent

Nakatani et al.

(10) Patent No.: US 6,945,715 B2
(45) Date of Patent: Sep. 20, 2005

(54) PRINTING CONDITION SETTING METHOD AND IMAGE FORMING DEVICE

(75) Inventors: Takaya Nakatani, Habikino (JP); Keisuke Tateishi, Kitakatsuragi-gun (JP)

(73) Assignee: Sharp Kabushiki Kaisha, Osaka (JP)

(*) Notice: Subject to any disclaimer, the term of this patent is extended or adjusted under 35 U.S.C. 154(b) by 29 days.

(21) Appl. No.: 10/473,824

(22) PCT Filed: Mar. 22, 2002

(86) PCT No.: PCT/JP02/02811

§ 371 (c)(1),
(2), (4) Date: Sep. 30, 2003

(87) PCT Pub. No.: WO02/082190

PCT Pub. Date: Oct. 17, 2002

(65) Prior Publication Data

US 2004/0107854 A1 Jun. 10, 2004

(30) Foreign Application Priority Data

Mar. 30, 2001 (JP) .................................... 2001-098769
Jun. 22, 2001 (JP) .................................... 2001-190490

(51) Int. Cl.$^7$ ................................................ B41J 5/30
(52) U.S. Cl. .................... 400/61; 400/62; 358/1.18; 399/82
(58) Field of Search ....................... 400/6, 61–63, 400/70, 74, 76; 358/1.1, 1.2, 1.9, 1.11–1.18, 450–453; 345/127–129, 439; 382/284, 298; 707/525, 910; 399/82, 85

(56) References Cited

U.S. PATENT DOCUMENTS 6,144,777 A * 11/2000 Tada et al. .................. 382/284
6,188,490 B1 * 2/2001 Miyake ...................... 358/1.18
6,427,058 B1 * 7/2002 Akiba et al. ................. 399/82
6,473,196 B2 * 10/2002 Usami et al. ............... 358/1.18
6,804,024 B1 * 10/2004 Kizaki et al. ............... 358/1.18

FOREIGN PATENT DOCUMENTS

| JP | 55-15143 | 2/1980 |
|---|---|---|
| JP | 01-265245 | 10/1989 |
| JP | 6-222641 | 8/1994 |
| JP | 10-222007 | 8/1998 |
| JP | 11-052630 | 2/1999 |
| JP | 11-84952 | 3/1999 |
| JP | 2000-330437 | 11/2000 |
| JP | 2001-189843 | 7/2001 |
| JP | 2002-057874 | 2/2002 |

* cited by examiner

Primary Examiner—Minh Chau
(74) Attorney, Agent, or Firm—David G. Conlin; William J. Daley, Jr.; Edwards & Angell, LLP

(57) ABSTRACT

In a case of printing documents having a plurality of pages (documents number c) on output sheets so as not to exceed a limited output sheets number a, the limited output sheets number a and an output copies number b are set (S1 and S2), and the documents number c is confirmed in reading the documents (S4). When the limited output sheets number a, the output copies number b, and the documents number c are recognized, a print document pages number d which is a number of original images that should be printed on each output sheet is set in accordance with the foregoing values (S5). When the print document pages number d is set, an output mode which allows the documents to be printed in accordance with the print document pages number d is set (S6), so that a printing operation is carried out (S7). Further, in S1, each of allowable amounts of sheets stored in (i) sheet feeding means, (ii) delivery means, and (iii) post-processing means may be recognized as the limited output sheets number a. Thus, in a case of outputting image data corresponding to the plural pages on the output sheets so as not to exceed the output sheets number less than the number of document pages, it is possible to reduce operations that the user has to perform in setting a printing condition.

23 Claims, 16 Drawing Sheets

4-IN-1 SINGLE-SIDE OUTPUT
FIG. 5 (a)
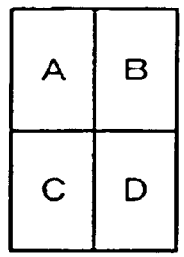
NO BACK SIDE
FRONT SIDE (A, B, C, D)
DOUBLE-SIDE COPY + 2-IN-1 OUTPUT
(2 UNIT IMAGES ARE PRINTED ON EACH SIDE)
FIG. 5 (b)
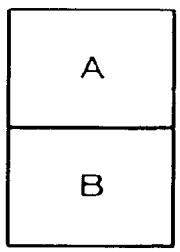 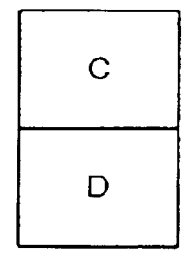
FRONT SIDE (A, B)     BACK SIDE (C, D)

FIG. 7

SINGLE-SIDE COPY OF 8-IN-1 IS
PERFORMED. (18 SHEETS) O.K.?

▲ YES

OUTPUT CONDITION

▲ ☑ DOUBLE-SIDE PRINTING IS FORBIDDEN

104 — ☐ IMAGE SIZE IS PRIORITIZED

☐ FEW OUTPUT SHEETS

▼ ☐ DOWNSIZING RATE IS LIMITED

FIG. 9

35 SHEETS ARE OUTPUTTED BASED
ON 4-IN-1 DOUBLE-SIDE COPY

105 — ▲ OUTPUT

▼ CANCEL

2-IN-1 OUTPUT SINGLE-SIDE OUTPUT
FRONT SIDE
FIG. 11 (a)
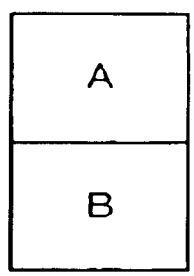
DOUBLE-SIDE COPY + 1-IN-1 OUTPUT
(ONE UNIT IMAGE IS PRINTED ON EACH SIDE)
FRONT SIDE    BACK SIDE
FIG. 11 (b)
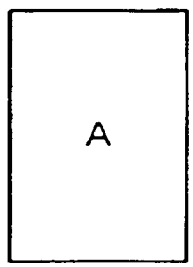 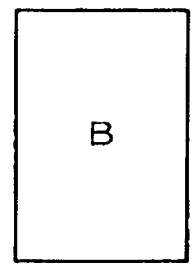

PRINTER DRIVER IMAGE IN PC

SET LIMITED SHEETS NUMBER

PRINTING CONDITION SETTING METHOD AND IMAGE FORMING DEVICE

TECHNICAL FIELD

The present invention relates to (i) a printing condition setting method for setting a condition under which an image forming device, such as a copying machine and a printer, outputs a less number of print sheets in printing image data (forming images), corresponding to plural pages, on output sheets (printing medium), and to (ii) an image forming device using the printing condition setting method. For example, the present invention can be preferably used in a case where a predetermined number of sheets are printed.

BACKGROUND ART

Conventionally, a user requires that an image forming device such as a copying machine and a printer reduce the number of output sheets. In a case of reducing the number of output sheets in performing a printing operation, it is general to select one from two output modes: (i) a double-side printing output mode for printing both front and back sides and (b) a 2-in-1 or 4-in-1 output mode for downsizing image data so that the image data, corresponding to plural pages of original images, is printed on each output sheet.

In the image forming device, upon outputting image data by using these processing functions, the user inputs setting of operation via an operation panel, so as to set a printing condition desired by the user.

For example, (1) Japanese Unexamined Patent Publication No. 84952/1993 (Tokukaihei 11-84952)(Publication date: Mar. 30, 1999) discloses a copy mode display device by which the user can select a recommended copy mode (recommended output mode) which can reduce the number of output sheets. Specifically, in the technique (1), a total number of copy sheets required in printing documents (required print output sheets number) is calculated, and when the required print output sheets number exceeds a predetermined threshold value, the recommended output mode such as a 2-in-1 single-side output mode and a 2-in-1 double-side output mode is displayed in a display section.

In the technique (1), the required print output sheets number is calculated on the basis of (i) an approximately calculated number of documents which is calculated by detecting means for detecting a height of documents stacked on a document table and (ii) a desired print copies number desired by the user in performing the printing operation. The desired print copies number is a number of output copies.

Incidentally, there is a case where a copying machine includes post-processing means for performing various kinds of post-processes with respect to printed output sheets. For example, an arrangement including a post-processing device such as a stapling device provided in a preceding stage of a delivered sheet tray (delivery tray) is known.

In the stapling process, several numbers of output sheets are stapled, so that some kinds of arrangements and stapling pins of the stapling device cannot staple the output sheets whose amount exceeds a predetermined number. Then, for example, (2) Japanese Unexamined Patent Publication No. 222641/1994 (Tokukaihei 6-222641)(Publication date: Aug. 12, 1994) discloses a copying system device (copying machine) for adjusting the number of output sheets so that it is possible to staple the output sheets even when the number of documents exceeds a standard number of the stapling process. In this technique (2), the number of documents set in the copying machine is counted in advance, and when the obtained number of documents exceeds the standard number of the stapling process, an output mode is automatically switched from (i) a single-side printing mode without downsizing to (ii) a double-side printing mode.

Here, as to a conventional image forming device having a general arrangement, in a case of printing the image data corresponding to plural pages so as not to exceed a predetermined number of output sheets whose amount is less than the plural pages, it is necessary to set "which function is to be used" after calculating the number of pages of image data which should be printed on each output sheet so as to set an appropriate printing condition, so that this brings about such a problem that the user is required to perform troublesome operations.

Further, in a case of printing the image data of documents whose amount is so large onto the output sheets, the user has to begin by counting the number of documents, so that the user has to perform more troublesome operations.

On the other hand, the foregoing techniques (1) and (2) can solve the aforementioned problems to some extent. However, these techniques bring about the following problems, so that effects thereof are still insufficient.

For example, in the technique (1), in printing the image data of documents whose amount is so large at all once, the number of output sheets may be limited depending on a condition of the copying machine, so that the user has to confirm the limit each time, thereby bringing about such a problem that operations are troublesome.

That is, when an amount of documents is so large that the number of documents cannot be concretely grasped, a printing condition set in the copying machine is prioritized. At this time, the user does not have to count the number of documents. However, for example, when an amount of output sheets remaining in a feeding tray of the copying machine and an amount of remaining output sheets that can be delivered to a delivery tray are the limit of the number of output sheets, the user has to confirm the limit.

While, in the technique (2), the output mode includes only two modes: a single-side printing mode and a double-side printing mode. Thus, when the number of documents is more than twice of the standard number of the stapling process, this brings about such a problem that it is substantially impossible to use the stapling process.

For example, when the standard number of the stapling process is 30 and the number of documents is 80, the number of documents exceeds 60 which is twice of the standard number. Thus, even when both sides of every sheet is printed, the number of output sheets is not within 30 sheets of the standard number. As a result, the printing operation is stopped.

Further, when the number of documents is within twice of the standard number of the stapling process, only the double-side printing can be performed, so that this arrangement does not satisfies the requirement of the user. Thus, the user has to confirm whether it is possible to perform the stapling process or not each time, so that this brings about such a problem that operations are troublesome.

Further, the foregoing problems are brought about not only in the copying machine but also in a printer which performs printing operation in response to data received from a computer. That is, also in a case where the printing operation is performed in response to a large quantity of data received from a computer, the printing condition of the printer is prioritized, so that the user has to confirm the limit of the number of output sheets as in the aforementioned case.

DISCLOSURE OF INVENTION

The present invention was conceived in order to solve the foregoing problems, and its object is to provide (i) a printing condition setting method which reduces the number of operations that the user has to perform in setting the printing condition in a case of outputting image data corresponding to plural pages on output sheets so as not to exceed an output sheets number less than the number of the pages, and (ii) an image forming device using the printing condition setting method.

In order to solve the foregoing problems, the printing condition setting method according to the present invention includes: a required print sheets number confirming step of confirming a required print sheets number in original images; a print output sheets number recognizing step of recognizing a print output sheets number in output sheets; a calculating step of calculating a number of the original images that should be printed on each output sheet in printing the original images of the required print sheets number on the output sheets so as not to exceed the print output sheets number; and a printing condition setting step of setting one or more printing conditions, each of which allows the original images of the required print sheets number to be printed on the output sheets so as not to exceed the printing output sheets number, in accordance with a calculation result obtained in the calculating step.

According to the foregoing method, in the case of outputting the image data corresponding to the plural pages on the output sheets so as not to exceed the predetermined output sheets number less than the number of the pages, the required print sheets number of the original images is confirmed in the required print sheets number confirming step, and the print output sheets number of the output sheets is recognized in the print output sheets number recognizing step.

Note that, the printing condition setting method can be applied to both a copying operation and a printer operation of the image forming device. The required print sheets number of the original images is a number of documents that can be read in performing the copying operation, and can be confirmed by counting the number of documents singly transported to a reading position by an automatic transport device upon reading the documents. Further, the required print sheets number in performing the printer operation is a number of pages of the image data inputted from an external device such as a PC (Personal computer), and can be confirmed in accordance with header information of the image data received on the side of the image forming device.

Further, the print output sheets number is a limited number of print output sheets, and can be set to a number desired by the user. Alternatively, a predetermined output sheets number such as a limited number of stapled output sheets upon performing a stapling operation can be utilized.

When the required print sheets number and the print output sheets number are determined, the number of original images that should be printed on each output sheet is calculated in accordance with the required print sheets number and the print output sheets number in the calculating step. Then, in the printing condition setting step, one or more printing conditions, each of which allows the original images of the required print sheets number to be printed on the output sheets so as not to exceed the print output sheets number, are set in accordance with the calculation result.

Thus, in the case of outputting the image data corresponding to plural pages on output sheets so as not to exceed the print output sheets number less than the number of the pages, the user does not have to perform such calculation that how many pages of the image data should be printed on each output sheet, thereby largely reducing operations in selecting the printing condition.

It is preferable to arrange the printing condition setting method according to the present invention so that: in the print output sheets recognizing step, the print output sheets number that has been set and inputted by a user is recognized.

According to the foregoing method, it is possible to output the image data corresponding to the plural pages as the desired number of output sheets that has been set by the user.

Alternatively, it is also preferable to arrange the printing condition setting method according to the present invention so that: in the print output sheets number recognizing step, a number of the output sheets remaining in sheet feeding means of an image forming device is confirmed, and thus confirmed number of the output sheets remaining in the sheet feeding means is recognized as the print output sheets number.

According to the foregoing method, in printing the image data corresponding to the plural pages, when the number of output sheets remaining in the sheet feeding means of the image forming device is less than the required print sheets number, the number of the remaining output sheets is regarded as the print output sheets number. Thus, the image data is outputted so that the image data is printed so as not to exceed the remaining output sheets. As a result, it is possible to avoid shortage of the output sheets during the printing operation.

It is preferable to arrange the printing condition setting method according to the present invention so that: in the printing condition setting step, when there are a plurality of the printing conditions that can be selected, the printing conditions are displayed so that the user can make a selection from the printing conditions so as to input thus selected one.

According to the foregoing method, when there are a plurality of selectable printing conditions, each of which allows original images of the required print sheets number to be printed on the output sheets so as not to exceed the print output sheets number, the printing conditions that can be selected are displayed so that the user can make a selection from the printing conditions so as to input thus selected one. Thus, it is possible to perform the printing operation in accordance with the printing condition desired by the user.

Alternatively, it is also preferable to arrange the printing condition setting method according to the present invention so that: in the printing condition setting step, when there are a plurality of the printing conditions that can be selected, one of the printing conditions is set in accordance with a priority condition (such as "double-side printing is forbidden" and "downsizing rate is limited") that has been set in advance.

According to the foregoing method, when there are a plurality of selectable printing conditions, each of which allows original images of the required print sheets number to be printed on the output sheets so as not to exceed the print output sheets number, one of the printing conditions is set in accordance with a priority condition that has been set in advance. Thus, it is possible to reduce the trouble that the user has to take in selecting the printing condition.

It is preferable to arrange the printing condition setting method according to the present invention so that: in the printing condition setting step, when there is no printing condition which allows the original images of the required print sheets number to be printed on the output sheets so as not to exceed the print output sheets number, one of the printing conditions which minimizes the print output sheets number is displayed so that the user can determine whether or not to cancel a printing operation so as to input the determination.

According to the foregoing method, when there is no printing condition which allows the original images to be printed on the output sheets so as not to exceed the print output sheets number that has been set, a most preferable printing condition is proposed to the user so that the user can determine whether or not to perform the printing operation in accordance with the proposed printing condition.

It is preferable to arrange the printing condition setting method according to the present invention so that: when a stapling process is selected in the image forming device, a maximum number of the output sheets stapled in performing the stapling process is set as the print output sheets number set in the print output sheets number recognizing step.

According to the foregoing method, when the stapling process is selected in the image forming device which employs the present printing condition setting method, it is possible to prevent such a printing operation that the number of output sheets is so large that the stapling process cannot be performed.

Further, the printing condition setting method according to the present invention may be arranged to include: a required print sheets number confirming step of confirming a required print sheets number in original images; a print output sheets number recognizing step of recognizing a print output sheets number in output sheets; an output copies number recognizing step of recognizing an output copies number; a calculating step of calculating a number of the original images, that should be printed on each output sheet in printing the original images of the required print sheets number on the output sheets so as not to exceed the print output sheets number, in consideration for the output copies number; and a printing condition setting step of setting one or more printing conditions, each of which allows the original images of the required print sheets number to be printed on the output sheets so as not to exceed the print output sheets number, in accordance with a calculation result obtained in the calculating step.

According to the foregoing method, in the case of printing a plurality of copies of the image data corresponding to the plural pages, when the image data is printed on the output sheets so as not to exceed a predetermined number, the required print sheets number of the original images is confirmed in the required print sheets number confirming step, and the print output sheets number of the output sheets is recognized in the print output sheets number recognizing step, and the output copies number is recognized in the output copies recognizing step. Note that, for example, the output copies number that has been set and inputted by the user in causing the image forming device to perform the printing operation is recognized by the device.

When the required print sheets number, the print output sheets number, and the output copies number are determined, in the calculating step, a number of the original images that should be printed on each output sheet is calculated in accordance with the required print sheets number, the print output sheets number, and the output copies number. Further, in accordance with the calculation result, the printing condition which allows the original images of the required print sheets number to be printed on the output sheets so as not to exceed the print output sheets number is set.

Thus, the user does not have to perform such calculation that how many pages of the image data should be printed on each output sheet, so that it is possible to largely reduce operations in selecting the printing condition and it is possible to apply the printing condition to the case where the plurality of copies are printed.

It is preferable to arrange the printing condition setting method according to the present invention so that: in the printing condition setting step, when there are a plurality of the printing conditions that can be selected, the printing conditions are displayed so that the user can make a selection from the printing conditions so as to input thus selected one.

According to the foregoing method, when there are a plurality of selectable printing conditions, each of which allows original images of the required print sheets number to be printed on the output sheets so as not to exceed the print output sheets number, the printing conditions that can be selected are displayed so that the user can make a selection from the printing conditions so as to input thus selected one. Thus, it is possible to perform the printing operation in accordance with the printing condition desired by the user.

Alternatively, it is also preferable to arrange the printing condition setting method according to the present invention so that: in the printing condition setting step, when there are a plurality of the printing conditions that can be selected, one of the printing conditions is set in accordance with a priority condition (such as "double-side printing is forbidden" and "downsizing rate is limited") that has been set in advance.

According to the foregoing method, when there are a plurality of selectable printing conditions, each of which allows original images of the required print sheets number to be printed on the output sheets so as not to exceed the print output sheets number, one of the printing conditions is set in accordance with a priority condition (such as "double-side printing is forbidden" and "downsizing rate is limited") that has been set in advance. Thus, it is possible to reduce the trouble that the user has to take in selecting the printing condition.

It is preferable to arrange the printing condition setting method according to the present invention so that: in the printing condition setting step, when there is no printing condition which allows the original images of the required print sheets number to be printed on the output sheets so as not to exceed the printing output sheets number, one of the printing conditions which minimizes the print output sheets number is displayed so that the user can determine whether or not to cancel a printing operation so as to input the determination.

According to the foregoing method, when there is no printing condition which allows the original images to be printed on the output sheets so as not to exceed the print output sheets number that has been set, a most preferable printing condition is proposed to the user so that the user can determine whether or not to perform the printing operation in accordance with the proposed printing condition.

The image forming device according to the present invention sets the printing condition by using the aforementioned printing condition setting methods.

According to the foregoing arrangement, in the case of outputting the image data corresponding to the plural pages on the output sheets so as not to exceed the print output sheets number less than the number of the pages, the required print sheets number of the original images is confirmed in the required print sheets number confirming step, and the print output sheets number of the output sheets is recognized in the print output sheets number recognizing step. Thus, the user does not have to perform such calculation that how many pages of the image data should be printed on each output sheet, so that it is possible to largely reduce operations in selecting the printing condition.

Further, in order to solve the foregoing problems, the printing condition setting method according to the present invention may be arranged to include: a total images number calculating step of calculating a total number of unit images, corresponding to image data which should be printed on each output sheet, in accordance with at least original images that have been inputted; a printing condition setting step of selecting a distribution number which is a number of the unit images printed on each output sheet so as to set a printing condition; and an allowable amount detecting step of detecting a condition concerning an allowable amount of output sheets which are allowed to be outputted in a single printing operation performed by an image forming device, wherein, in the printing condition setting step, the printing condition is set in accordance with at least (i) the total number of the unit images that has been calculated and (ii) the allowable amount that has been detected.

According to the foregoing method, in the printing condition setting step, the printing condition is set in accordance with (i) the total number of the unit images of the original images and (ii) the allowable amount of the output sheets. Thus, the user does not have to confirm (i) the total number of unit images of original images and (ii) a condition of the image forming device every time. As a result, it is possible to improve the simplicity of the operation.

Note that, the allowable amount of the output sheets is an amount detected in the allowable amount detecting step, and is an amount of the output sheets which can be printed in a single printing operation performed by the image forming device.

While, the unit image is image data that should be printed on each output sheet, and the total number of the unit images is an amount of the image data that should be printed on each output sheet. Thus, the total number of the unit images of the original images is an amount of the image data of the original images that should be printed on each output sheet. For example, as to the total number of the unit images of documents in a case where a copying machine makes one copy of the documents, the following two cases are brought about.

That is, in a case where there is a single set of image data that should be printed on each output sheet, the total number of the unit images is equal to the number of documents. While, in a case where there are a plurality sets of image data that should be printed on each output sheet, the total number of the unit images is not equal to the number of documents. The case where there are a plurality of sets of image data that should be printed on each output sheet is a case where the documents are printed on the basis of the 2-in-1 or 4-in-1 output mode for example. That is, in a case where the documents are printed on the basis of the 2-in-1 output, the total number of the unit images is twice as many as the number of documents.

Further, in a case of a printer which receives original image data from a computer, image data that should be printed on each output sheet is set in accordance with the user's intention, and the image data is the unit image.

The total number of the unit images is calculated in the total images number calculating step, and it is preferable to further arrange the printing condition setting method according to the present invention so that: in the total images number calculating step, the original images are temporarily stored in storage means, and then the total number of the unit images of the original images is calculated.

According to the foregoing method, the total number of the unit images is calculated based on the image data that has been stored in the storage means after inputting the original image data. Thus, even in a case where it is impossible to grasp how many unit images exist upon printing a large amount of original images, the user does not have to confirm the total number again, so that it is possible to calculate the total number of the unit images rapidly and exactly.

It is preferable to arrange the printing condition setting method according to the present invention to further include a print copies number setting step of setting a print copies number which is a number of copies each of which is obtained by performing a single printing operation with respect to the original images, wherein in the total images number calculating step, the total number of the unit images is calculated in accordance with at least (i) the original images that have been inputted and (ii) the print copies number that has been set.

According to the foregoing method, also in the case of printing plural copies of the original images, single entry of the original images enables the plural copies to be printed.

It is preferable to further arrange the printing condition setting method according to the present invention so that: in the allowable amount detecting step, at least any one of (i) an amount of the output sheets remaining in sheet feeding means of an image forming device, (ii) an amount of the output sheets that can be delivered by delivery means delivering the output sheet that have been printed, and (iii) an amount of the output sheets that can be post-processed by post-processing means post-processing the output sheets that have been printed, is detected as the condition concerning the allowable amount.

According to the foregoing method, in the printing condition setting step, the printing condition is set in accordance with the total number of the unit images of the original images and the allowable amount. Thus, in printing a plurality of sheets, the user does not have to confirm the total number of unit images of original images and conditions of functions provided in the image forming device every time. As a result, it is possible to improve the simplicity of the operation.

It is preferable to further arrange the printing condition setting method according to the present invention so that: the post-processing means includes any one of (i) stapling means for performing a stapling process, (ii) punching means for performing a punching process, and (iii) sorting means for performing a sorting process.

According to the foregoing method, in printing a plurality of sheets, the user does not have to confirm conditions of functions provided in the post-processing means every time. As a result, it is possible to improve the simplicity of the operation.

It is preferable to further arrange the printing condition setting method according to the present invention so that: when the output sheets to be printed are standardized output sheets that have been uniformly standardized, the amount of the output sheet that can be post-processed is fixed in accordance with a type of the post-processing means.

According to the foregoing method, the amount of the output sheets that can be post-processed can be fixed, thereby further simplifying the printing condition setting process. Further, in a case of using only a specific output sheet such as PPC (Plane paper copy), it is possible to substantially omit the allowable amount detecting means. This is based on such reason that: in a case of using the most general PPC, even when types of PPC slightly differ from each other, this rarely brings about substantial change in the number of the output sheets that can be stapled.

It is preferable to further arrange the printing condition setting method according to the present invention to further include a limited output sheets number setting step of setting a limited output sheets number in printing the original images, wherein, in the printing condition setting step, the printing condition is set in accordance with at least (i) the total number of the unit images that has been calculated, (ii) the allowable amount that has been detected, and (iii) the limited output sheets number that has been set.

Note that, the limited output sheets number is a number of output sheets required in accordance with the user's intention in printing the original image. That is, in a case where the user wants to limit the number of output sheets on which the original images are printed, the user inputs the limited output sheets number in the image forming device.

According to the foregoing method, the printing condition is set in accordance with (i) the total number of unit images of original images, (ii) the allowable amount, and (iii) the limited output sheets number that has been set. Thus, in printing a plurality of sheets, the user does not have to confirm the total number of unit images of original images and a condition of the image forming device every time. As a result, it is possible to improve the simplicity of the operation and to reduce the cost of the output sheets.

That is, the printing condition setting method of the present invention is such that: how many unit images should be allocated to each output sheet is determined in accordance with the total number of the unit images of the original images. Thus determined number of unit images is used as a distribution number of the unit images so that the unit images are distributed to each output sheet in accordance with the distribution number upon performing the printing operation.

It is preferable to further arrange the printing condition setting method according to the present invention so that: in the printing condition setting step, a plurality of formation layouts are prepared so that the unit images are disposed in each output sheet in accordance with the distribution number of the unit images that has been selected.

According to the foregoing method, in the printing condition setting step, various output patterns (formation layouts) are prepared upon printing the original images. Thus, it is possible to print the original images in accordance with the output patterns corresponding to various printing types such as "double-side printing is forbidden" and "it is necessary to minimize the downsizing rate of the original images".

It is preferable to further arrange the printing condition setting method according to the present invention so that: in the printing condition setting step, combinations each of which is constituted of (i) the distribution number of the unit images and (ii) each of the formation layouts are recognized as output modes, and the printing condition is set by selecting one from the output modes.

According to the foregoing method, in the printing condition setting step, a plurality of combinations of (i) the distribution number of the unit images formed on each output sheet and (ii) the formation layout in each output sheet are recognized. Thus, in the printing condition setting step, it is possible to control the setting of the printing condition by selecting one mode from the plurality of output modes. Thus, it is possible to simplify the printing condition setting process.

It is preferable to further arrange the printing condition setting method according to the present invention so that: in the printing condition setting step, whether or not it is possible to carry out a printing operation in accordance with the printing condition that has been set is determined, and when it is impossible to carry out the printing operation in accordance with the printing condition that has been set, the printing condition is carried out in accordance with a predetermined printing condition.

According to the foregoing method, even when a printing condition which does not allow the printing operation to be performed is set due to various conditions such as actual functions of the image forming device, it is possible to substantially eliminate the foregoing printing condition that has been set. Thus, it is possible to perform the printing operation in accordance with various conditions such as actual functions of the image forming device.

It is preferable to arrange the printing condition setting method according to the present invention to further include a desired condition inputting step of inputting a printing condition desired by the user, wherein, in the printing condition setting step, the printing condition desired by the user is preferentially set.

According to the foregoing method, a desired printing condition can be inputted in advance, and a printing condition is set in accordance with the inputted printing condition. Thus, for example, it is possible to eliminate a printing condition that is not desired by the user in advance, so that it is possible to perform the printing operation which further satisfies the user's needs. Further, even when it is impossible to perform the printing operation in accordance with the printing condition desired by the user due to a condition of the image forming device, it is possible to set a printing condition which is close to the user's needs.

It is preferable to arrange the printing condition setting method according to the present invention to further include a printing condition confirming step of (i) causing display means to display the printing condition that has been set in the printing condition setting step and (ii) performing an inputting operation so as to cause inputting means to change the printing condition to another printing condition.

According to the foregoing method, even when a printing condition which does not satisfy the user's intention, it is possible to change the printing condition by performing the printing condition confirming step. Thus, it is possible to carry out the printing operation in accordance with a printing condition which satisfies the user's intention.

The image forming device according to the present invention sets a printing condition by using the aforementioned printing condition setting method.

According to the foregoing arrangement, due to the printing condition setting step, in printing a plurality of sheets, the user does not have to confirm the total number of unit images of original images and a condition of the image forming device every time. As a result, it is possible to improve the simplicity of the operation.

For a fuller understanding of the nature and advantages of the invention, reference should be made to the ensuing detailed description taken in conjunction with the accompanying drawings.

BRIEF DESCRIPTION OF DRAWINGS

FIG. 5(a) and FIG. 5(b) are explanatory drawings each of which shows an output mode which can be selected when (the number of pages of documents to be printed)=4.

FIG. 7 is an explanatory drawing for illustrating a modification example of a setting confirmation image of the output mode in the case where the output mode is selected in FIG. 6.

FIG. 8 is an explanatory drawing for illustrating a priority output condition setting image in which priority is predetermined in terms of functions and conditions to be used when there are a plurality of selectable output modes in the printing condition setting method.

FIG. 9 is an explanatory drawing for illustrating a guide display image when there is a selectable output mode in the printing condition setting method.

FIG. 11(a) and FIG. 11(b) are explanatory drawings each of which shows an output mode which can be selected in a case where (distribution number of unit images)=2.

BEST MODE FOR CARRYING OUT THE INVENTION

One embodiment of the present invention is described below with reference to the attached drawings.

Figure 2:
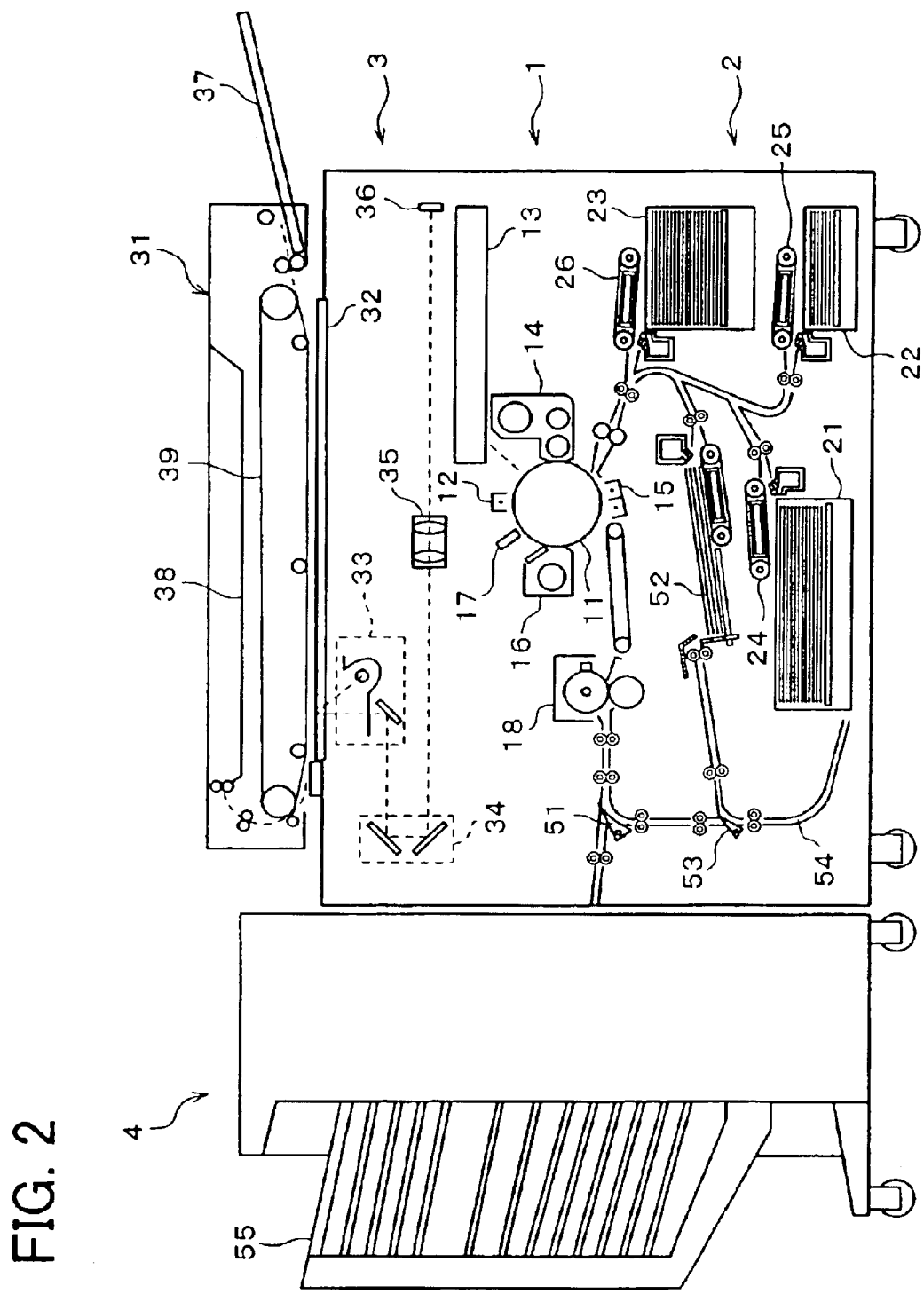
FIG. 2 is a schematic showing an arrangement of an image forming device which employs the printing condition setting method.

FIG. 2 schematically shows an arrangement of an image forming device which is one embodiment of the present invention. As shown in FIG. 2, the image forming device includes an image forming section 1, a sheet supplying section 2, a document reading section 3, and a post-processing section (post-processing means) 4. Note that, the image forming device shown in FIG. 2 is an example of an arrangement of the present invention, and the present invention is not limited to this.

The image forming section 1 is provided with an electronic photograph processing section in which a photoreceptor drum 11 is centered. Around the photoreceptor drum 11, there are provided: an electrification unit 12 for uniformly electrifying a surface of the photoreceptor drum 11; a light scanning unit 13 for scanning a light image on the photoreceptor drum 11 that has been uniformly electrified so as to write an electrostatic latent image; a development unit 14 for visualizing the electrostatic latent image written by the light scanning unit 13 by using developer; a transcription unit 15 for transcribing an image reproduced on the photoreceptor drum 11 onto an output sheet; a cleaning unit 16 for removing the developer left over on the photoreceptor drum 11 after performing the transcription so as to enable a new image to be recorded on the photoreceptor drum 11; and an electricity removal lamp unit 17 for removing an electric charge from the surface of the photoreceptor drum 11. In a downstream of the electronic photograph processing section, a fixing device is disposed, and the fixing device sequentially receives output sheets on which images have been transcribed, so as to thermally fix the developer transcribed on each output sheet.

Under the image forming section, there is disposed the sheet supplying section 2 which can store the output sheets. The sheet supplying section 2 is constituted of (i) sheet storing trays 21 to 23 each of which stores the output sheets and (ii) separately feeding sections (separately feeding means) 24 to 26 each of which separately feeds each output sheet stored in the sheet storing trays 21 to 23. Each output sheet separately fed by each of the separately feeding sections 24 to 26 is sequentially supplied to a gap between the photoreceptor drum 11 and the transcription unit 15, and an image recorded and reproduced on the photoreceptor drum 11 is transcribed onto each output sheet.

Alternately, the image forming section 1 may be an ink-jet processing section (not shown). Specifically, the image forming section 1 is an ink head which moves perpendicularly with respect to a transport direction of the output sheet. In this arrangement, a sheet transport mechanism (not shown) moves each output sheet fed from each of the sheet storing trays 21 to 23 by every certain distance, so that a partial image on a line corresponding to the moving distance is formed on the output sheet. This operation is repeated, so that a complete image is formed on a surface of the output sheet, and the output sheet is then transported to the post-processing section 4. Note that, a fixing section (not shown) for fixing an image on the output sheet by drying ink may be provided at a preceding stage of the post-processing section 4.

The document reading section 3 performs document reading in the following two modes: (i) an automatic reading mode in which sheet-shaped documents are automatically supplied by an automatic document transport device 31 and each document is sequentially subjected to exposure scanning so that a document image is read and (ii) a manual reading mode in which a book-shaped document or a sheet-shaped document which cannot be automatically supplied by the automatic document transport device 31 is manually set so that a document image is read. Further, an image of a document set on a transparent document placement table 32 is subjected to the exposure scanning performed by a first scanning unit 33 and a second scanning unit 34 that move along the document placement table 32 in a predetermined speed relationship therebetween, and the image is focused on a photoelectric conversion element (CCD) 36 by optical parts such as a mirror and an image focus lens 35, thereby outputting the document image that has been converted into an electric signal.

The automatic document transport device 31 includes a document transport section (document transport means) 39 which transports a document placed on a document setting tray 37 toward the document placement table 32 and delivers the scanned document to the document delivery tray 38. Further, the automatic document transport device 31 rotates on its back side functioning as a fulcrum, so that its front side opens so that the sheet-shaped document which cannot be automatically supplied is placed on the document placement table 32 and the sheet-shaped document can be read by scanning.

Further, the automatic document transport device 31 may be arranged as double-side reading automatic document transport means. In this case, the automatic document transport device 31 includes: a transport path for a single-side document; a transport path for a double-side document; a transport path switching section; and a sensor group for grasping and managing a condition under which the document passes through the respective sections, so as to cause the document reading section 3 to read a single side or both sides of the document in accordance with selection made by the user. As the automatic document transport device 31, it is possible to make selection from various known arrangements as required in accordance with a using condition, and its arrangement is not particularly limited.

Document image data read by the document reading section 3 is subjected to a predetermined image process. Thereafter, the image data is sent to the light scanning unit 13 of the image forming section 1, and an electrostatic latent image based on the image data is written on the photoreceptor drum 11. Thereafter, the electrostatic latent image is developed, so that an image is transcribed onto the output sheet. Thus, the image forming device of the present embodiment functions as a page printer which prints an image read from a single document on a single output sheet.

The output sheet on which the image has been fixed by the fixing device 18 is selectively transported to the post-processing section 4 or a double-side transport unit 52 by a switching gate 51 disposed in a downstream of the fixing device. In the post-processing section 4, the transported output sheet is subjected to a post-process such as a stapling process, a punching process, and a sorting process. The printed output sheet is finally delivered to the delivery tray 55.

Further, in a case of transporting the output sheet to the double-side transport unit 52, the output sheet passing through the switching gate 51 is transported to a switching back transport path 54 by the switching gate 53. After being switched back, the output sheet is sent to the double-side transport unit 52. Thus, as to the output sheet sent from the double-side transport unit 52 to the electronic photograph processing section again, an image is formed on a back side of a surface on which an image has been formed, so that it is possible to perform the double-side printing.

Figure 3:
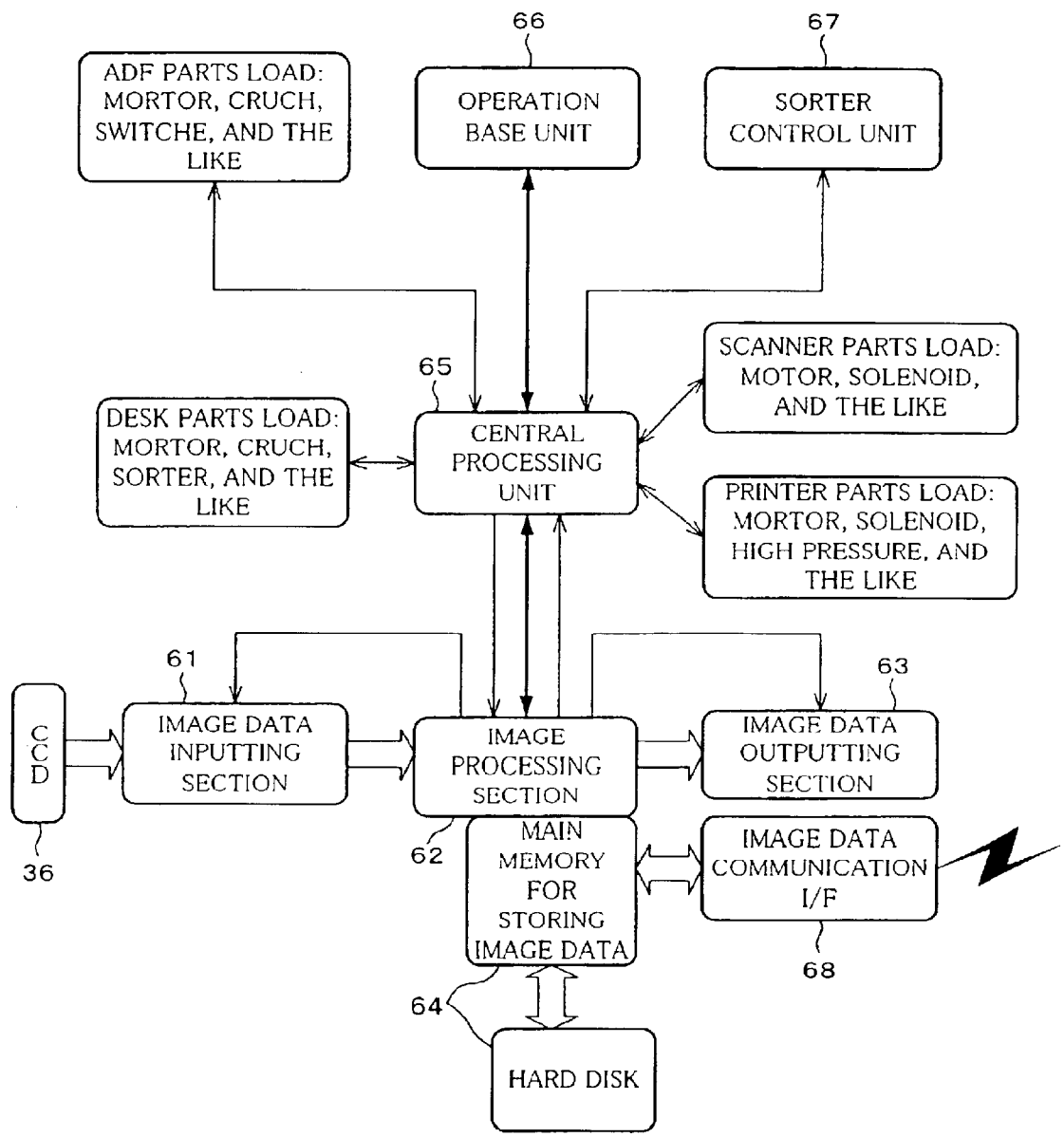
FIG. 3 is a block diagram showing an arrangement of a control section of the image forming device.

Next, an arrangement of the control section of the image forming device will be described with reference to FIG. 3.

The image forming device includes: an image data inputting section 61; an image processing section 62; an image data outputting section 63; a memory 64 constituted of various kinds of ordinary memory such as RAM (Random Access Memory) and a hard disk; a central processing unit 65; an operation base unit 66; a sorter control unit 67; and an image data communication I/F 68.

The image data inputting section 61 performs binary conversion with respect to the document image data which has been photoelectrically converted by the photoelectric conversion element (CCD) 36, and processes the image data by error diffusion while taking a histogram as a binary digital amount, and stores the processed image data in the memory 64.

The image processing section 62 is a processing section for finally converting the inputted image data into image data desired by the user. Until the image data is stored in the memory 64 as finally converted output image data, the image data is processed in this processing section.

The image data output section 63 restores the image data stored in the memory 64 in a compression manner, and reconverts the image data into 256 gray scales, and performs the error dispersion of quaternary data which realizes smoother half tone than the binary data, and forwards the data to the light scanning unit 13 of the image forming section 1.

Note that, data treated by the image data inputting section 61 and the image data outputting section 63 is stored in the memory 64 basically in a form of binary data so as to reduce the capacitance of the memory 64. However, it is possible to process the data in a form of quaternary data taking deterioration of the image data into consideration.

In accordance with sequence control, a central processing unit (control means) 65 manages driving mechanisms such as a motor and a clutch (printer parts load, desk parts load, scanner parts load, ADF parts load) of sections constituting the image forming device: the image forming section 1, the sheet feeding section 2, the image reading section 3, the automatic document transport device 31, and the like. The central processing unit 65 also outputs a control signal for controlling the respective sections.

Further, the central processing unit 65 is connected to an operation base unit 66 constituted of an operation panel so that they can mutually communicate with each other. The control signal is forwarded to the central processing unit 65 in accordance with various kinds of output modes that have been set and inputted by the user, and the image forming device is operated in accordance with a main mode that has been set.

Further, the control signal that indicates an operation condition of the image forming device is forwarded to the operation base unit 66. On the side of the operation base unit 66, the control signal causes a display section or the like to display the operation condition so as to inform a condition of the device to the user.

Further, in a case where the user sets an output condition via the operation panel of the operation base unit 66, the central processing unit 65 causes the image processing section 62 to perform predetermined process (downsizing process, layout process, and the like) in accordance with the output condition that has been set, and controls a condition under which the image data output section 63 outputs the image data.

The sorter control unit 67 is a control unit which manages an operation of the post-processing section 4 for sorting copies outputted by the image forming device.

Further, the image data communication I/F 68 is provided so as to enable information communications (communications of image information, image control signal, and the like) with other digital image devices.

The printing condition setting method according to the present embodiment is described as follows with reference to the flow chart of FIG. 1. Note that, the following description shows a copying operation caused by a copying function of the image forming device as an example.

First, the user sets a limited output sheets number (limited number of output sheets to be printed) a corresponding to a single job (S1). The limited output sheets number a is a number of output sheets that is desired by the user. For example, the limited output sheets number a is set in a case of copying n-number of documents onto not more than a-number of output sheets so as to reduce the number of output sheets. In a case where a plurality of output sheets are desired, the user sets an output copies number b (S2), and a start key is pushed down in the operation panel (S3). Further, in S2, when the user does not set the output copies number b, (output sheets number b)=1 is automatically set.

Note that, in the present embodiment, S1, S2, and S3 respectively correspond to a print output sheets number recognizing step, an outputted copies number recognizing step, and a required print sheets number confirming step that are recited in claims.

By pushing down the start key, the image reading section 3 begins an operation for reading the set document. The image reading section 3 not only carries out the operation for reading the document but also counts the documents number (required print sheets number) c (S4). Upon performing the operation for reading the document, a printing operation is not performed until all the documents are read so as to count the number of documents number c. Thus, the read image data is temporarily stored in the memory 64 until the printing operation begins.

Next, a print document pages number d which is the number of document pages that should be printed on each output sheet is calculated by the central processing unit 65 in accordance with (a) the limited output sheets number a and the output copies number b that have been set in S1 and S2 and (b) the documents number c, so that the print document pages number d is set (S5).

Figure 4:
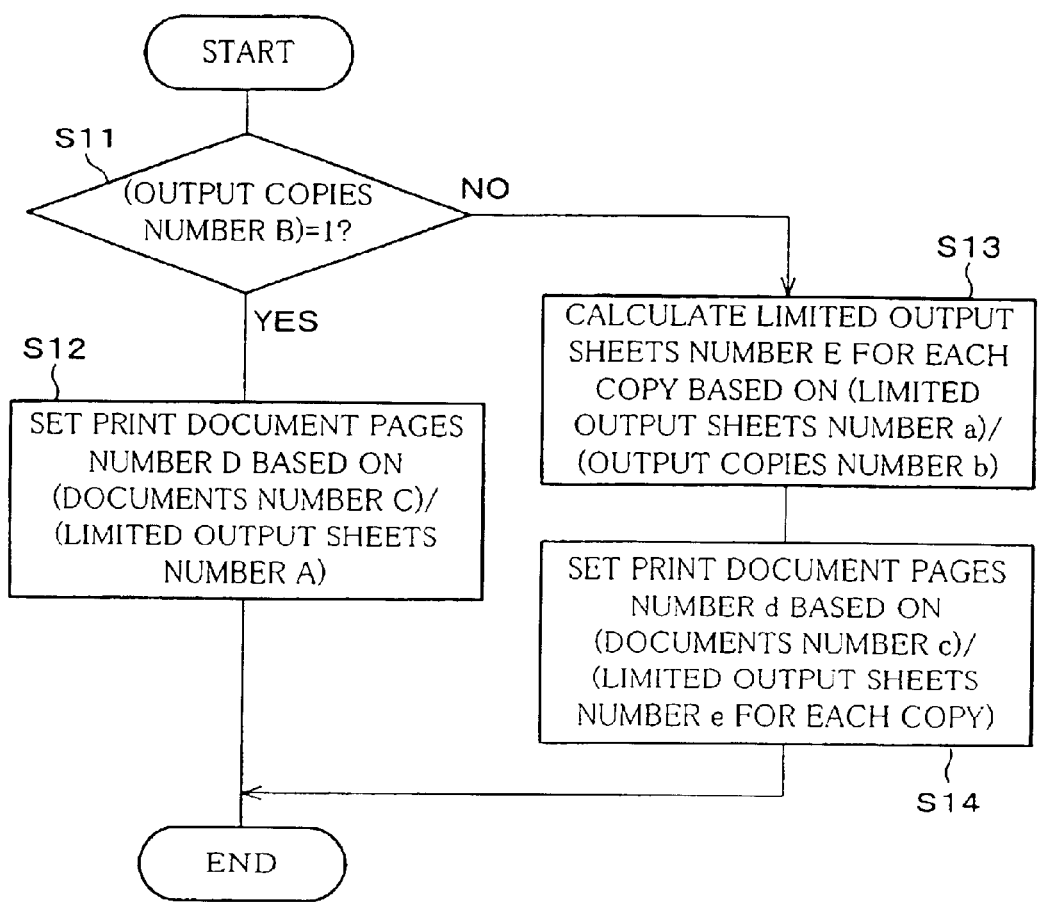
FIG. 4 is a flow chart showing how to calculate the number of pages of documents to be printed in accordance with the printing condition setting method.

Here, how the print document pages number d is calculated in S5 is detailed as follows by taking a specific example with reference to the flow chart of FIG. 4.

The calculation of the print document pages number d requires calculation procedures that are different from each other in the case where (output copies number b)=1 and in the case where (output copies number b)≠1, so that whether (output copies number b)=1 holds or not is confirmed at first (S11).

In the case where (output copies number b)=1, the print document pages number d is set, by using the limited output sheets number a and the documents number c, in accordance with an expression (documents number c)/(limited output sheets number a) (S12). For example, in the case where the limited output sheets number a=10 and the documents number=40, the calculation is (documents number c)/(limited output sheets number a)=40/10=4. Thus, the print document pages number d: the number of document pages that should be printed on each output sheet is 4. Note that, the print document pages number d needs to be set as a natural number. In a case where the number obtained by the expression (documents number c)/(limited output sheets number a) is not the natural number, a minimum natural number exceeding thus obtained number is set as the print document pages number d.

While, in the case where (outputted copies number b)≠1, before calculating the print document pages number d, a single-copy limited output sheets number e is calculated, by using the limited output sheets number a and the output copies number b, in accordance with the expression (limited output sheets number a)/(output copies number b) (S13). Further, the print document pages number d is set, by using the single-copy limited output sheets number e and the documents number c, in accordance with an expression (documents number c)/(single-copy limited output sheets number e) (S14).

For example, in a case where the limited output sheets number a=70 and the output copies number b=8 and the documents number c=30, calculation is performed as follows: (limited output sheets number a)/(output copies number b)=70/8=8 and the remainder is 6. Thus, the single-copy limited output sheets number is 8. Further, calculation is performed as follows: (documents number c)/(single-copy limited output sheets number e)=30/8=3 and the remainder is 6. Thus, the print document pages number d which is the number of document pages that should be printed on each output sheet is 4.

That is, the single-copy limited output sheets number e and the print document pages number d need to be set as natural numbers. However, in a case where a number obtained by the expression (limited output sheets number a)/(output copies number b) as to the single-copy limited output sheets number e is not the natural number, a natural number which does not exceed thus obtained number is set as the single-copy limited output sheets number e. In a case where the number obtained by the expression (limited output sheets number a)/(output copies number b) as to the print document pages number d is not the natural number, a minimum natural number exceeding the obtained number is set as the print document pages number d.

When the print document pages number d is set by performing the process of S2, an output mode (printing condition) which allows the print document pages number d to be realized in performing the printing operation is selected and set (S6). The selection of the output mode in S6 is based on combination of a double-side printing mode and an N-in-1 mode such as a 2-in-1 and a 4-in-1 mode. How to select the output mode will be detailed later.

Note that, in the present embodiment, S5 corresponds to a calculating step recited in claims and S6 corresponds to a printing condition setting step recited in claims.

When the output mode is set in S6, the image forming device carries out an output process based on the output mode (S7).

As described above, the image forming device according to the present embodiment is arranged so that: in a case of performing the printing operation while reducing the output sheets number with respect to the number of documents to be printed, the user has only to set the limited output sheets number a and the output copies number b, so that it is possible to carry out the output process by performing a simple operation.

Figure 1:
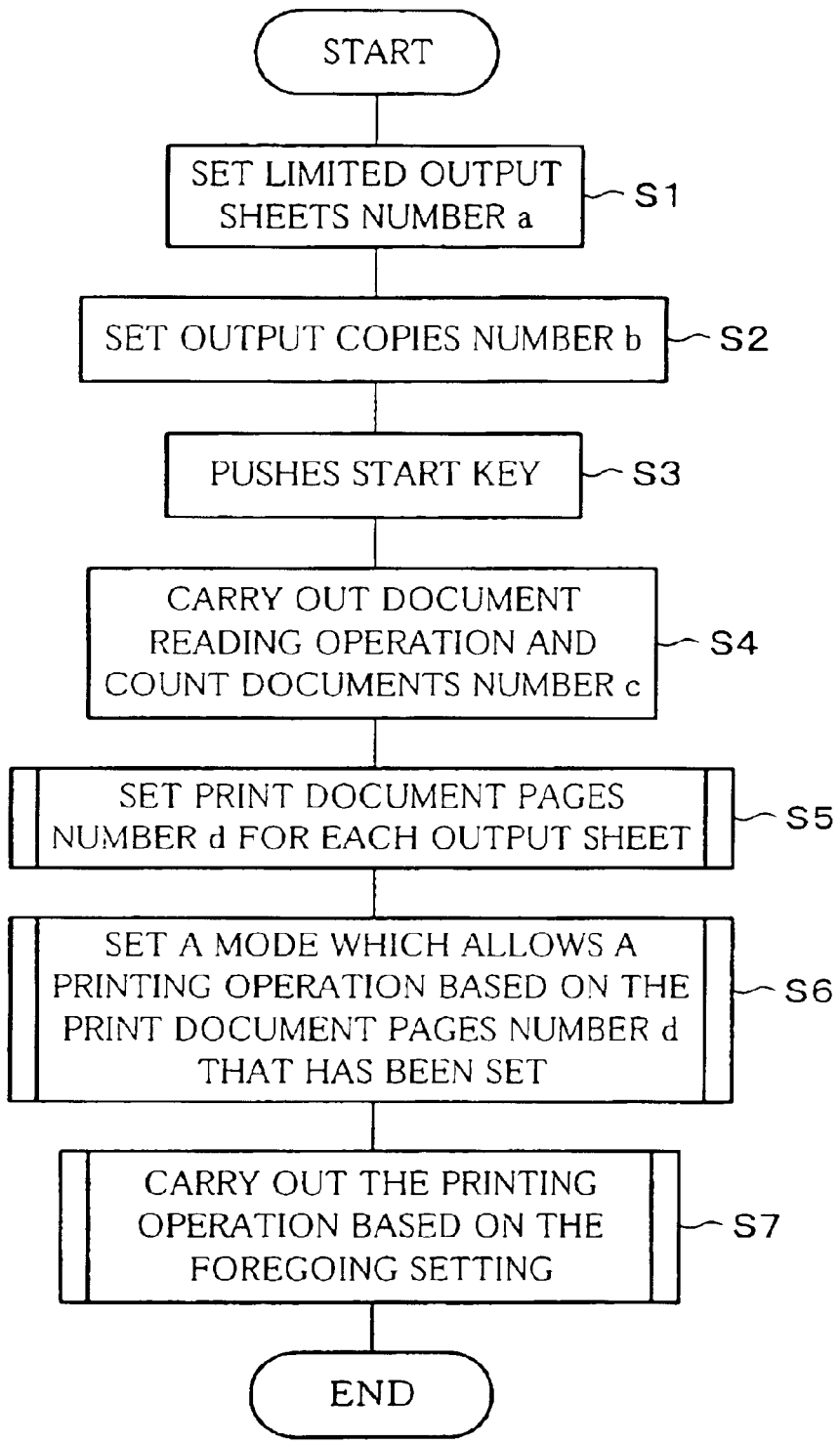
FIG. 1 shows one embodiment of the present invention, and is a flow chart showing a procedure of a printing condition setting method.

Next, a selection/setting process of the output mode in S6 concerning FIG. 1 is described as follows. Note that, in the following description, as functions which can be selected in the image forming device, there are (i) a double-side printing function for printing both front and back sides of the output sheet and (ii) an N-in-1 function for downsizing and disposing images corresponding to an N-number of documents on a single side of the output sheet in performing the printing operation. These functions are combined with each other so that the output mode is set based on the combination.

For example, in the steps of S5, as described in the foregoing example, when the print document pages number d is set to 4, an output mode which allows four or more pages of document to be printed on each output sheet. The output mode in this case is such that: a single-side output with 4-in-1 mode (see FIG. 5(a)) or a double-side output with 2-in-1 mode (see FIG. 5(b)) is performed. The output mode allows four pages of document to be printed on each output sheet.

Note that, in setting the output mode here, the number of pages of document actually printed on each output sheet need not correspond to the print document pages number d. At least the same number of or more pages of document as or than the print document pages number d are printed on each output sheet. For example, in a case where the print document pages number d is set to 7 or in similar case, there is no output mode in which 7 pages of document are printed on each output sheet, so that an output mode in which 8 pages of document are printed on each output sheet (double-side printing with an 8-in-1 or a 4-in-1 output) is selected.

Further, in the case of allowing the same number of or more pages of document as or than the printed document pages number d on each output sheet, all the output modes each of which uses the N-in-1 function of N≧d can be selected. However, it is general to set such an output mode that the number of pages of document printed on each output sheet is closest to the print document pages number d that has been set.

Figure 6:
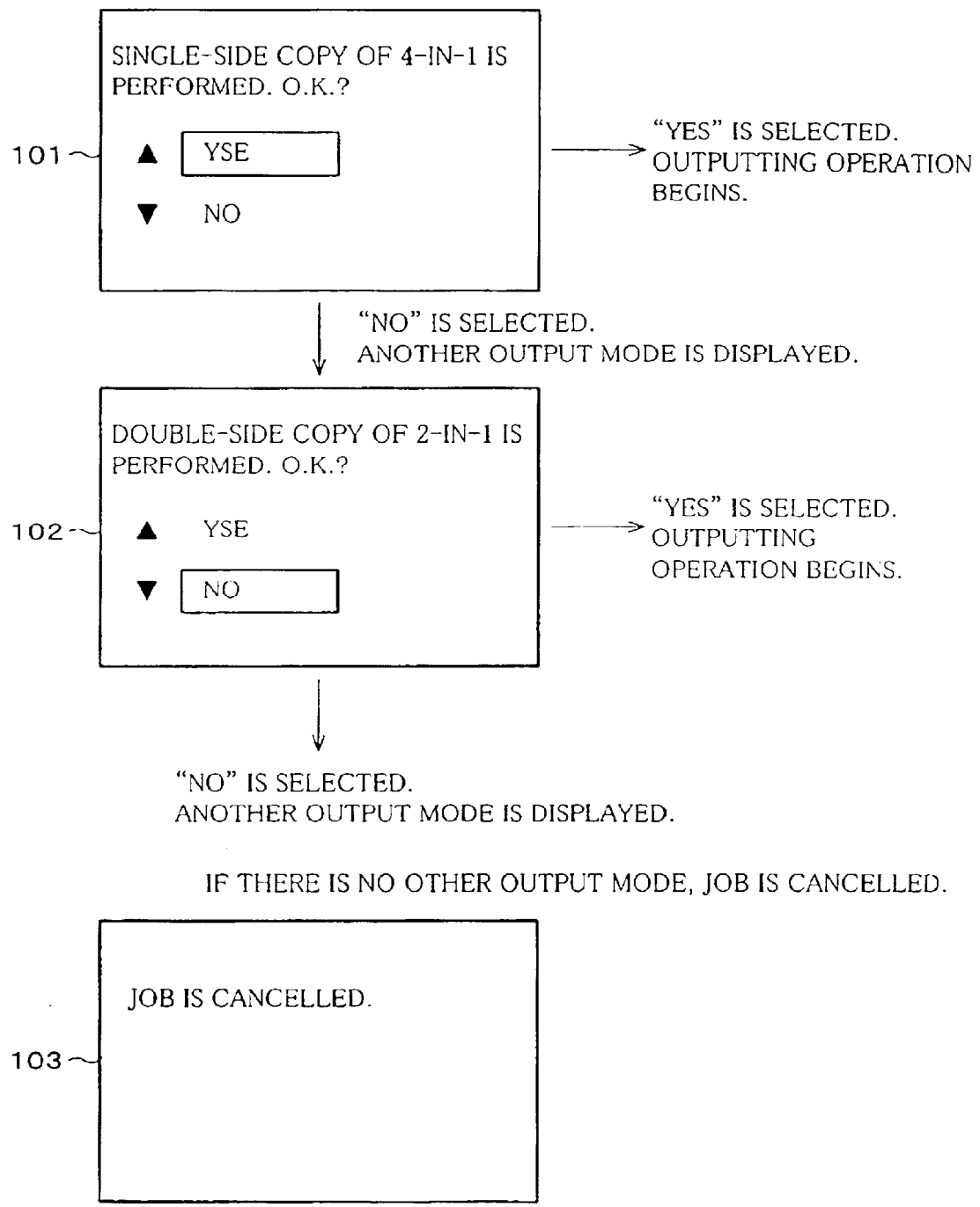
FIG. 6 is an explanatory drawing for illustrating a procedure in which a user selects an output mode when there are a plurality of selectable output modes.

In selecting the output mode, as described above, in a case where there are a plurality of selectable modes, as shown in FIG. 6, a display image 101 is displayed in the operation panel, so as to inform the user of an output mode to be carried out so that the user confirms the output mode. In a case where the user selects "Yes" in the display image 101, the printing output begins based on the displayed output mode.

Further, in a case where the user selects "No" in the display image 101, a display image 102 is displayed so as to inform the user of another selectable output mode so that the user confirms the output mode. In a case where the user selects "Yes" in the display image 102, the printing output begins based on the displayed output mode.

In this manner, in the case where the user selects "Yes" in a setting confirmation image such as the display image 101 and the display image 102, when there is another output mode of a different pattern, a setting confirmation image of the output mode is displayed. Further, when "No" is selected in every setting confirmation image of every selectable output mode, the job is cancelled. At this time, a display image 103 is displayed in the operation panel so as to inform the user of the job cancellation.

Note that, the job cancellation in the case where "No" is selected in every setting confirmation image of every selectable output mode may be performed as follows: whether or not to carry out the job cancellation is confirmed by the user, and the job cancellation is not performed until the user inputs a cancellation instruction. In this case, when the user does not give the cancellation instruction, the display image returns to the display image 101.

Further, it may be so arranged that: in the setting confirmation image of the output mode, all the selectable output modes are displayed in the same window so that the user can select one from the output modes. In this case, the job cancellation may be included in the selection branches.

Further, it may be so arranged that: in the setting confirmation image of the output mode, as shown in FIG. 7, the output sheets number at that time is displayed together. Further, it may be so arranged that: in a case where there exists only one output mode which enables the predetermined print document pages number d to be printed, the setting confirmation image of the output mode is omitted and the output process of the job is immediately carried out, depending on setting of the user.

In the foregoing description concerning FIG. 6, when there are a plurality of selectable output modes, an output mode to be set is selected by the user. However, it may be so arranged that: a condition and priority of using functions are set in advance, an output mode to be set is automatically selected on the side of the device.

In order to set the condition and the priority of the using functions in advance, the following operations are performed: for example, as shown in FIG. 8, a display image 104 which is a priority output condition setting image in a menu in a key operator program is displayed, and an item the user wants to set is selected by causing a cursor key to move a cursor up and down in the display image 104, and a function or ON/OFF of a condition in each item is set by pushing down an OK key. In the display image 104, a check mark is added to a check box upon setting ON in each item.

Note that, examples of the function or the condition whose priority can be set are as follows. Of course, the present invention is not limited to them.

Double-side printing is forbidden . . . The double-side printing function is not used.

Image size is prioritized . . . A process which makes an image (output image) as large as possible is selected.

Few sheets are outputted. . . . A process which outputs as few sheets as possible.

Downsizing rate is limited. . . . The lower limit of the downsizing rate is set, and a process which does not satisfy the lower limit is not selected.

Double-side printing is prioritized. . . . The double-side printing function is always selected.

Further, in setting the functions and conditions which should be prioritized as described above, conditions conflicting with each other may exist. Thus, it is preferable that: when the one condition is set, the other condition cannot be set. Since "Double-side printing is forbidden" and "Double-side printing is prioritized" conflict with each other in the foregoing example, it is preferable to make arrangement so that these conditions cannot be set at the same time.

Further, the image forming device is arranged so that: the print document pages number d of documents which should be printed on each output sheet is set in accordance with (i) the limited output sheets number a and the outputted copies number b that are set by the user and (ii) the documents number c counted in reading the documents, and an output mode which enables the documents to be printed in accordance with the print document pages number d is selected/set. However, functions of the image forming device is limited (it is impossible to perform the double-side printing, and it is impossible to use an N-in-1 function more than the 4-in-1 function, and similar cases), so that there is a possibility that the number of actually outputted sheets is not within the limited output sheets number a that has been set by the user.

For example, in the image forming device having functions not more than the 4-in-1 function, when the image forming device is set so that 280 documents are printed on 30 output sheets (that is, (limited output sheets number a)=30), the print document pages number d is calculated so that (documents number c)/(limited output sheets number a)=280/30=9 and the remainder is 10, so that (print document pages number d)=10. That is, it is necessary to print more than 10 documents on each output sheet.

However, according to the functions of the image forming device, even in a case of using (i) the 4-in-1 function which is an output mode minimizing the number of output sheets and (ii) the double-side copy function together, at most eight documents can be printed on each output sheet. Thus, the image forming device cannot print more than 10 documents on each output sheet.

In this manner, the functions of the image forming device are limited, so that it is sometimes impossible to perform the output process within the limited output sheets number a that has been set by the user. In such case, it is preferable to make such an arrangement that: as shown in FIG. 9, (i) an output mode which causes the image forming device to minimize the number of output sheets and (ii) the number of output sheets in a case where documents are printed in accordance with the foregoing mode (in the output mode of the foregoing example, 280/8=35, that is, 35 output sheets are required in performing the printing operation) are displayed in the display image 105 of the operation panel so that whether to output in this output mode or to cancel the job can be selected.

In the image forming device described above, the limited output sheets number a is set to a number desired by the user, but the present invention is not limited to this. Examples of setting the limited output sheets number a are as follows.

For example, in a case where the image forming device includes the post-processing section 4 and the post-processing section 4 has the stapling function as shown in FIG. 2, particularly, in a case where carrying out the stapling process is selected, it is possible to set the output mode by setting the maximum stapled sheets number as the limited output sheets number a in the same manner as in the foregoing description.

Further, in a case where a large number of documents are set in the document reading section 3 and few output sheets are set in the sheet feeding section 2, shortage of the sheets stops the output processing during the printing operation. In order to prevent such disadvantage, amounts of remaining sheets (amounts of remaining output sheets) in the sheets storing strays 21 to 23 of the sheet feeding section 2 are always managed/monitored by the image forming device, and the output mode can be set by setting the amounts of remaining sheets as the limited output sheets number a in the same manner as described above.

Note that, in order to cause the image forming device to manage/monitor the amounts of sheets remaining in the sheet storing trays 21 to 23 of the sheet feeding section 2, the following process can be performed for example. In each of the sheet storing trays 21 to 23, the stored output sheets are placed on a rotational plate, and an uppermost output sheet of the placed output sheets is disposed on a feeding position by causing rotation of a motor to push down the rotational plate.

Further, after being drawn from the image forming device so as to store the sheets, each of the sheet storing trays 21 to 23 is returned to the image forming device. At this time, the rotational plate moves, thereby pushing up the output sheets. A distance traveled by the rotational plate varies in accordance with the amount of the output sheets, so that it is possible to detect the amounts of remaining sheets by detecting the distance traveled by the rotational plate. It is preferable to detect the distance traveled by the rotational plate in accordance with a pulse number of the motor.

Further, while performing the copying and printing operations, the amounts of sheets remaining in the sheet storing trays 21 to 23 are reduced since the output sheets are used. At this time, the rotational plate moves upward as the number of the output sheets are reduced, so that it is possible to grasp the amounts of remaining sheets that vary during the printing operation.

Thus, in the image forming device of the present invention, an output mode is set so that the output sheets number is not more than the amounts of sheets remaining in the sheet feeding section 2. Thus, it is possible to avoid such disadvantage that shortage of the sheets stops the output process during the printing operation.

Further, as an example, the foregoing description shows the output mode setting in the case where the copying function of the image forming device performs the copying operation, but the present invention is not limited to this. It is possible to apply the present invention to a case where the image forming device exhibits a printer function by receiving image data from a PC (Personal Computer) connected to the image forming device so as to perform the printer operation.

In a case of setting the output mode upon performing the foregoing process at a time when the printer function is exhibited, the documents number c of the copying operation corresponds to the number of pages of the image data sent from the PC. Header information of the image data is referred to, so that the number of pages of the image data can be easily recognized by the image forming device.

Figure 10:
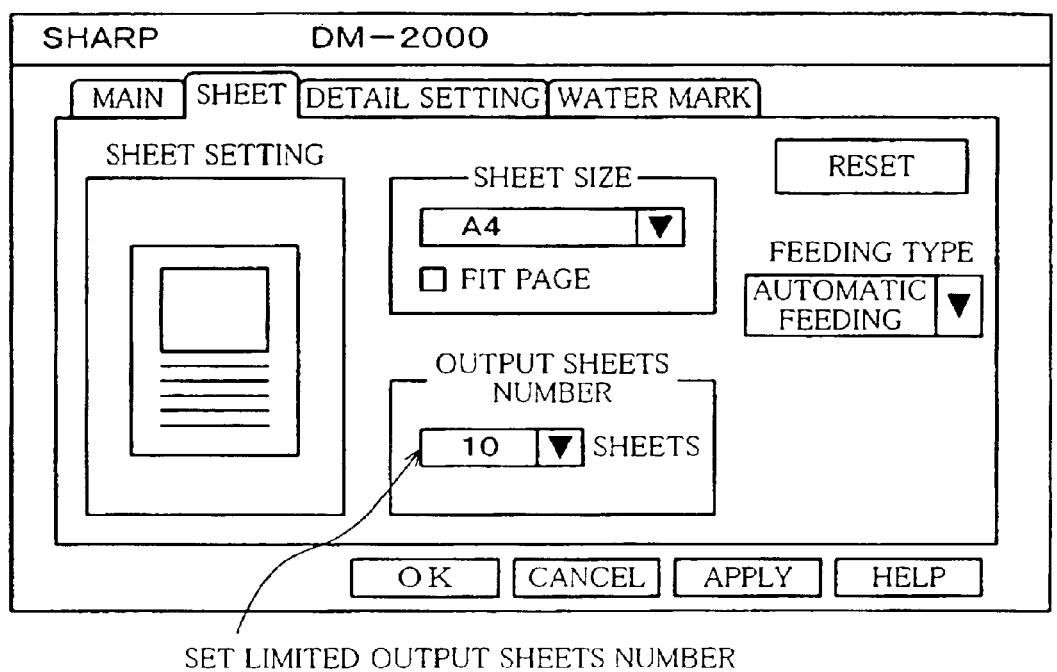
FIG. 10 is an explanatory drawing for illustrating a setting image in a case where a limited output sheets number and an outputted copies number are set in a driver image of a PC in accordance with a printing condition setting method which is another embodiment of the present invention.

Further, it is preferable to set the limited output sheets number a and the outputted copies number b in the driver image of the PC as shown in FIG. 10. Further, it is preferable to display a display image for the user as shown in FIGS. 6 to 9 in the PC screen.

[Embodiment 2]

Another embodiment of the present invention is described as follows with reference to attached drawings. Note that, the present invention is not limited to this. Further, for the convenience in description, the same reference signs are given to members having the same functions as the members used in Embodiment 1, and description thereof is omitted.

An image forming device of the present embodiment controls setting of a printing condition and performs the printing operation in accordance with conditions such as (i) a total number of unit images of original images, (ii) a limited output sheets number, and (iii) an allowable amount. Further, a printing condition setting method according to the present embodiment is a method for setting the printing condition in accordance with the foregoing conditions.

The unit images are image data which should be printed on each output sheet, and the total number of the unit images is an amount of the image data that should be printed on each output sheet. Thus, the total number of the unit images of the original images is an amount of the image data of the original images that should be printed on each output sheet.

For example, as to the total number of the unit images of documents (original images) in a case where a copying machine makes one copy of the documents, the following two cases are brought about.

That is, in a case where there is a single set of image data that should be printed on each output sheet, the total number of the unit image is equal to the number of documents. While, in a case where there are a plurality sets of image data that should be printed on each output sheet, the total number of the unit images is not equal to the number of documents. The case where there are a plurality sets of image data that should be printed on each output sheet is a case where the documents are printed on the basis of the 2-in-1 or 4-in-1 output for example. That is, in a case where the documents are printed on the basis of the 2-in-1 output, the total number of the unit images is twice as many as the number of documents.

Further, in a case of a printer which receives original image data from a computer, image data that should be printed on each output sheet is set in accordance with the user's intention, and the image data is the unit image.

The limited output sheets number is a number of output sheets required in accordance with the user's intention in printing the original image. That is, in a case where the user wants to limit the number of output sheets on which the original images are printed, the user inputs the limited output sheets number in the image forming device.

The allowable amount is a number of sheets that the image forming device can print by a single printing operation, and will be detailed later.

The image forming device of the present embodiment is arranged basically in the same manner as in Embodiment 1, so that description thereof is omitted. However, as described in Embodiment 1, the image forming device according to the present invention is not limited to the image forming device of FIG. 2.

In the present embodiment, how many unit images should be allocated to each output sheet is determined in accordance with the total number of the unit images of the original images. Thus determined number of unit images is used as a distribution number of the unit images so that the unit images are distributed to each output sheet in accordance with the distribution number in performing the printing operation.

Conventionally, in a case where the user tries to reduce the number of output sheets, the distribution number P of the unit images is set to be not less than 2 with respect to each output sheet. Specifically, as shown in FIG. 11($b$), there is a case where a single unit image is printed on each of both sides of the output sheet (double-side printing), and as shown in FIG. 11($a$), there is a case where two unit images are printed on a single side of a single output sheet (2-in-1 output), and as shown in FIG. 5($a$), there is a case where four unit images are printed on a single side of a single output sheet (4-in-1 output).

Further, in cases of the 2-in-1 output and the 4-in-1 output, the unit image(s) may be printed on a back side likewise. Thus, as shown in FIG. 5($b$), the 2-in-1 output is combined with the double-side printing, so that it is possible to output up to four unit images on each output sheet ($P \leq 4$). While, the 4-in-1 output is combined with the double-side printing, so that it is possible to output up to eight unit images on each output sheet ($P \leq 8$). Of course, how to form a plurality of unit images on each output sheet is not limited to the foregoing three patterns.

In other words, there are a plurality of formation layouts in which the unit images are disposed on each output sheet in accordance with the distribution number P. Thus, it is possible to perform the printing operation while satisfying the following conditions: even when the distribution number P is the same, the double-side printing is forbidden, or a downsizing rate of the original image needs to be kept as low as possible.

For example, when the double-side printing is forbidden, the printing operation is performed in accordance with such an output pattern that each unit pattern is disposed on a single side of the output sheet. When the downsizing rate of the original image needs to be kept as low as possible, the printing operation is performed in accordance with such an output pattern that each unit pattern is disposed on a single side of the output sheet.

In these output patterns, the distribution number P upon actually printing a single output sheet is such that: when the double-side printing is performed, P=2, and when the 2-in-1 output is performed, P=2 or 4, and when the 4-in-1 output is performed, P=4 or 8. The distribution number P is set by the central processing unit 65 (see FIG. 3) as a printing condition.

In the present invention, it is preferable to set the output pattern as the output mode (printing condition).

The output pattern includes not only a value of the distribution number P but also a formation layout of the distribution number P. Thus, when the distribution number P=2, there are (i) an output mode based solely on the 2-in-1 output as shown in FIG. 11($a$) and (ii) an output mode based solely on the double-side printing as shown in FIG. 11($b$). While, when the distribution number P=4, there are (i) an output mode based solely on the 4-in-1 output as shown in FIG. 5($a$) and (ii) an output mode in which the double-side printing and the 2-in-1 output are combined with each other as shown in FIG. 5($b$).

In other words, the output pattern is set for each printing condition, and the printing condition includes (i) a most important sub-condition concerning the distribution number P for each sheet and (ii) another sub-condition concerning the formation layout of the unit images. Therefore, in a case where there are many printing conditions due to combination of the sub-conditions, they are set and registered as output modes (printing conditions) in advance. Thus, when the central processing unit 65 controls the setting of the conditions, a single output mode is selected from a plurality of output modes, so that it is easy to set the printing condition. That is, it is possible to simplify the printing condition setting process.

Thus, it is preferable that: when an output mode is solely based on the 2-in-1 output, a 2-in-1 single-side mode is set (FIG. 11($a$)), and when the double-side printing and the 2-in-1 output are combined with each other (FIG. 5($b$)), a 2-in-1 double-side mode is set, and when an output mode is solely based on 4-in-1 output (FIG. 5($a$)), a 4-in-1 single-side mode is set, and when the double-side printing and the 4-in-1 output are combined with each other, a 4-in-1 double-side mode is set.

Note that, in the present embodiment, an ordinary output mode, that is, an ordinary output mode which causes only one unit image to be copied on each output sheet is regarded as a 1-in-1 single-side mode.

The printing condition setting method of the present embodiment includes: a total images number calculating step of calculating the total number of unit images of original images; a printing condition setting step of setting the printing condition; a limited output sheets number setting step of setting the limited output sheets number; and an allowable amount detecting step of detecting a condition concerning the allowable amount. Further, in the printing condition setting step, the printing condition is set in accordance with (i) the calculated total number of the image units, (ii) the limited output sheets number that has been set, and (c) the detected allowable amount.

Specifically, in the printing condition setting step, the limited output sheets number and the allowable amount are compared with the total number of the unit images so as to confirm whether they are large or small with respect to the total number. Thereafter, based on the comparison result, the printing condition (output mode) which enables the printing operation is selected in the printing condition setting step.

The total number of unit images of original images is calculated in accordance with original image data that has been inputted to the image forming device. Here, it is preferable to arrange the image forming device so that the original image data is temporarily stored in the memory 64.

Thus, the total number of the unit images is calculated based on the image data that has been stored in the memory 64 after inputting the original image data. Thus, even in a case where it is impossible to grasp how many unit images exist after performing the printing operation by using whole the original image data, the user does not have to confirm the total number again, so that it is possible to calculate the total number of the unit images rapidly and exactly.

For example, in a case where there is image data of many documents and two or more unit images exist in several documents as the image data, the foregoing arrangement brings about such advantage that: the user does not have to confirm the image data and it is possible to calculate the total number of the unit images rapidly and exactly.

Further, in order to facilitate the calculation of the total number of the unit images of the original images, the printing condition setting method of the present embodiment further includes the copies number setting step of setting the number of copies of the original images. In the copies number setting step, the total number of the unit images is calculated in accordance with (i) the number of copies that has been set and (ii) the inputted original image. Thus, even in a case where a plurality of copies of the original image are printed, it is possible to print the plurality of copies by performing a single entry of the original image.

Here, the limited output sheets number and the copies number are inputted by an operation base unit (inputting means) 66 (see FIG. 3) provided on the image forming device. In a case where the image forming device is a copying machine, these numbers are inputted by using the operation panel having a numeric key pad. In a case where the image forming device is a printer, these numbers may be inputted by using an operation section provided on the printer, or the limited output sheets number as data may be inputted with the image data from the PC. In this case, an input port of the printer corresponds to the operation base unit 66.

Figure 12:
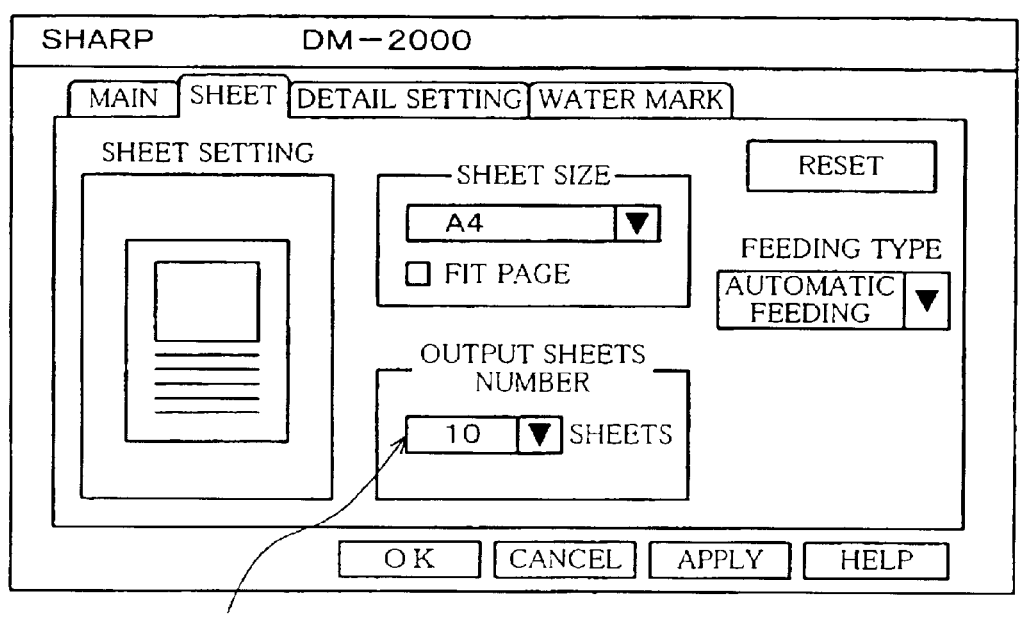
FIG. 12 is an explanatory drawing for illustrating a setting image in a case where the limited output sheets number and the outputted copies number are set in the driver image of PC in accordance with a printing condition setting method which is another embodiment of the present invention.

For example, as shown in FIG. 12, a printer driver image is displayed in a display screen of the PC so that the respective conditions can be inputted. In FIG. 12, an image for setting the conditions of the output sheets is displayed. In addition to the setting of the output sheets (layout is displayed) and the output sheet size (for example, A4 is selected), an item for setting the output sheets number is displayed. Further, the output sheets number (limited output sheets number) such as "10" is inputted here.

A specific arrangement of the operation base unit 66 is not particularly limited, but it is preferable to provide not only the inputting means such as the numeric key pad but also display means. As the display means, for example, various kinds of display means such as a liquid crystal panel provided on the operation section of the copying machine can be used. The display means is a touch-panel type, and functions also as the inputting means.

Further, in the case where the image forming device is a printer and is connected to an information terminal such as the PC so as to constitute a printing system, it may be so arranged that: the printing condition is displayed in the display screen of the PC so that the printing condition can be changed on the side of the PC. Thus, in the present invention, the printing condition setting method can be applied to the printing (image forming) system.

The condition concerning the allowable amount is a condition concerning an allowable amount of the output sheets which can be printed in a single printing operation, and the condition is detected by the allowable amount detecting means. Specifically, examples of the allowable amount detecting means are (i) a remaining sheet amount detecting section (not shown) for detecting amounts of output sheets remaining in the sheet storing trays (sheet feeding means) 21 to 23 and (ii) a deliverable amount detecting section (not shown) for detecting a deliverable amount of the printed output sheets delivered by the delivery tray (delivery means) 55. It is preferable to use at least one of them or preferably both of them as the allowable amount detecting means.

In the image forming device, determination of the distribution number for each output sheet mainly depends on the number of the output sheets. As the number of the output sheets, (i) the number of output sheets that can be fed by the image forming device and (ii) the number of output sheets that can be delivered can be used. Then, these numbers are detected as the condition concerning the allowable amount and are used as the setting condition, so that it is possible to set a more appropriate printing condition, and the user does not have to confirm conditions of the sheet storing trays 21 to 23 and the delivery tray 55. As a result, it is possible to improve simplicity of the operation.

Next, the foregoing steps will be described with reference to the flow chart of FIG. 13. Note that, in the present embodiment, the allowable amount is the remaining sheet amount of each of the sheet storing trays 21 to 23 of the sheet feeding section 2 (see FIG. 2), and is managed/monitored on the side of the image forming device so as to set the output mode.

First, in S21, the image forming device causes the remaining sheet amount detecting section (not shown) to detect a remaining sheet amount f (allowable amount detecting step). In S22, the user sets and inputs a print copies number g into the copying machine, and instructs the copying machine to start the printing operation (copies number setting step).

In S23, the document transport device 31 transports the documents placed on the document setting tray 37 to the document placement table 32 one by one, and the document reading section 3 reads the document image. The read document image is stored in the memory 64 (see FIG. 3). At the same time, the total number of the unit images (hereinafter, referred to as total images number) $h_o$ in printing only one copy of the original images is counted. In S24, an actually printed total images number h is calculated in accordance with (i) the print copies number g that has been set in S22 and (b) the total images number $h_o$ that has been counted in S23. That is, $h = h_o \times g$. Note that, S23 and S24 correspond to a total images number calculating step.

In and after S25, the total images number h and the remaining sheet amount f are compared with each other so as to automatically select the output mode. That is, the operations in and after S25 correspond to the printing condition setting step.

First, when $h \leq f$, the step proceeds to S30. The printed total images number h does not exceed the allowable amount of the remaining sheet amount f, so that the printing operation is carried out in accordance with an ordinary mode, for example, the 1-in-1 single-side mode. That is, in the case of the 1-in-1 single-side mode, the total images number h is the number j of the actually printed output sheets (hereinafter, referred to as print output sheets number j), so that $j \leq f$.

Adversely, when $h > f$, the step proceeds to S26. In this case, the total images number h of the actually printed images exceeds the allowable amount of the remaining sheet amount f, so that an output mode which enables images of the total images number h to be printed so as not to exceed the remaining sheet amount f is selected. That is, the distribution number P of such unit images that the print output sheets number j≦the sheet remaining amount f is selected. Further, an output mode which satisfies the selected distribution number P is set, and the printing operation is performed in accordance with the output mode. Here, in a case where there are a plurality of output modes each of which satisfies the selected distribution number P, the printing operation is carried out in accordance with a priority level of the output modes that has been predefined in the image forming device.

In the present invention, it is possible to input a printing condition that is desired by the user, and it is possible to set the output mode in accordance with the printing condition desired by the user. Thus, it may be so arranged that: at least at a preceding stage of the printing condition (output mode) setting step (S25), a desired condition inputting step for inputting the desired printing condition is carried out.

Further, in S27, whether the desired printing condition is selected or not is confirmed. When the desired printing condition is not selected, the printing operation is carried out in accordance with a priority level of the output modes that has been determined in S28. While, when the desired printing condition is selected, the output mode is set in accordance with the printing condition desired by the user in S29 so as to carry out the printing operation.

Thus, it is possible to eliminate a printing condition that is not desired by the user in advance. In other words, it is possible to perform the printing operation which further satisfies needs of the user. Further, even in a case where it is impossible to perform the printing operation in accordance with the printing condition desired by the user due to properties of the image forming device, it is possible to set a printing condition which is close to the desired printing condition.

A specific example of how to select the desired printing condition is shown in FIG. 8. That is, by displaying output conditions such as "double-side printing is forbidden", "image size is prioritized", "few output sheets number", "downsizing rate is limited", and "double-side printing is prioritized" (not shown) in the display means, desired printing conditions are limited. Further, items are selected by using a cursor key so as to set the output condition. In a case where the output condition is set, a check mark is added to a check box displayed beside the corresponding output condition so as to inform that the condition has been set. Note that, detail of FIG. 8 and content of the output condition are described in Embodiment 1, so that description thereof is omitted here.

Further, when the printing condition (output mode) is set under the control of the central processing unit 65 (see FIG. 3), there is a case where the printing operation cannot be carried out in accordance with the set condition.

Then, in order to prevent such disadvantage, any initial condition is set in the image forming device as the printing condition. In a case where it is impossible to perform the set printing operation, it is preferable to carry out the printing operation in accordance with the initial condition. In this case, whether or not the printing operation can be carried out in accordance with the printing condition that has been set in the printing condition setting step is determined. When it is impossible to carry out the printing operation in accordance with the printing condition, the printing operation is carried out in accordance with the initial condition.

Thus, it is possible to eliminate the printing condition by which the printing operation cannot be carried out, so that it is possible to perform the printing operation in accordance with various conditions of actual functions of the image forming device.

It is preferable that: the printing condition setting method of the present invention further includes a printing condition confirming step of causing the display means to display an automatically set printing condition right after performing the printing condition setting step so that the printing condition can be changed.

There is a case where the printing condition that has been automatically set in the printing condition setting step does not satisfy the needs of the user. However, by performing the printing condition confirming step, it is possible to carry out the printing operation in accordance with the printing condition which further satisfies the needs of the user.

Note that, the display means is not particularly limited. As the display means, it is possible to use various kinds of display means such as a liquid crystal panel provided on the operation section of the image forming device. In a case where the image forming device is connected to an information terminal such as a PC so as to constitute a printing system, it is possible to use a display screen of the PC.

The foregoing arrangement will be described with reference to the flow charts of FIGS. 13 and 14 and a display example of the operation panel of FIG. 15.

In S31, a printing condition desired by the user is selected (desired condition inputting step). Further, when the step moves back to S27 in the flow chart of FIG. 13, the printing condition desired by the user has been set. Thus, the step proceeds to S29, and an output mode which satisfies the needs of the user. Here, the step proceeds to S32 before carrying out the printing operation.

In S32, in terms of function, whether or not the image forming device can perform the printing operation in accordance with the output mode set in S29 is confirmed. When the image forming device cannot perform the printing operation in accordance with the output mode, the step proceeds to S34, and the image forming device performs the printing operation in accordance with an output mode predefined as the initial condition. That is, each of S32 and S34 corresponds to the printing condition setting step.

Adversely, when the image forming device can perform the printing operation in accordance with the output mode, the step proceeds to S33. When the step proceeds to S31, whether or not the printing operation may be performed in accordance with the output mode set in S33 is confirmed (printing condition confirming step). For example, a display image (display means) 201 shown in FIG. 15 is displayed in the operation panel (inputting means).

Figure 15:
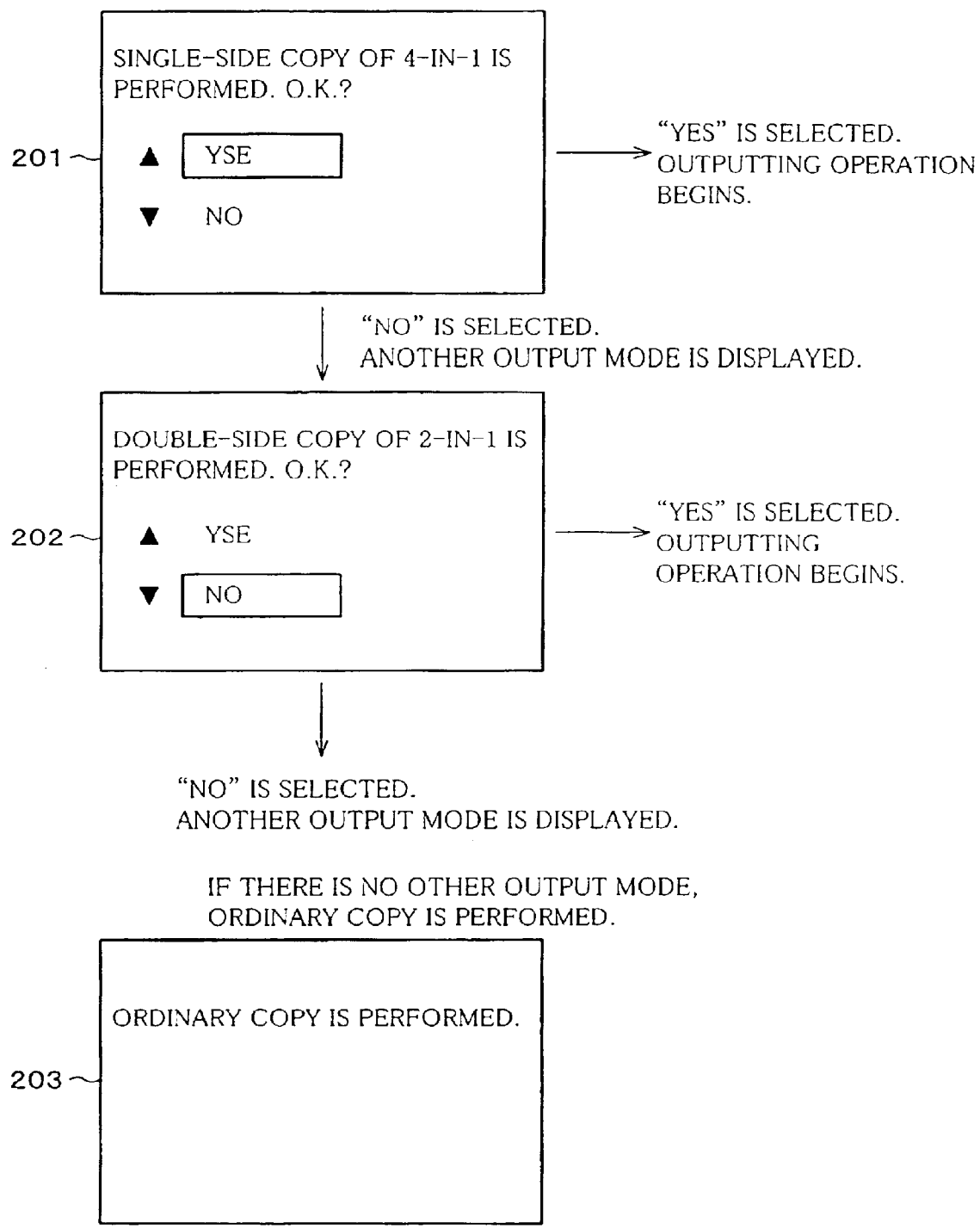
FIG. 15 is an explanatory drawing for illustrating a procedure in which the user selects an output mode in a case where there are a plurality of selectable output modes in accordance with the printing condition setting method.

That is, as shown by the display image 201 of FIG. 15, "Single-side copy of 4-in-1 is performed (4-in-1 single-side mode) O.K.?" is displayed. When the user selects "Yes", the step proceeds to S36, and the printing operation is performed in accordance with the output mode. When the user selects "No", the step proceeds to S35, and the output mode is changed to another output mode of a different pattern. That is, also S35 corresponds to the printing condition setting step. Further, as shown by a display image 202 of FIG. 15, "Double-side copy of 2-in-1 is performed (2-in-1 double-side mode) O.K.?" is displayed (S33). When the user selects "Yes", the printing operation is performed in accordance with the output mode (S36).

Here, when the user selects "No" with respect to all the modes that have been set and there is no other output mode, the step proceeds to S34, and as shown by a display image

203 of FIG. 15, "Ordinary copy (1-in-1 single-side mode) is performed." is displayed. Then, the printing operation is carried out in accordance with the initially set output mode (S36).

Alternately, when the user selects "No" with respect to all the output modes and there is no other output mode, it is preferable to set the output mode in accordance with the condition desired by the user that has been selected in S31. For example, if the user selects "few output sheets number (print output sheets number j)", an output mode which minimizes the print output sheets number j is selected from output modes of the image forming device, so that the printing operation is performed in accordance with the output mode.

Alternatively, when the user selects "No" with respect to all the output modes and there is no other output mode, it is preferable that: for example, in the printing condition confirming step, the user is asked to confirm the output mode so that re-supply of the output sheets and change of the output mode can be selected. That is, when the printing condition automatically set in the printing condition setting step does not satisfy the needs of the user, the re-supply of the output sheets or the change of the output mode can be selected, so that it is possible to perform the printing operation in accordance with the printing condition which further satisfies the needs of the user.

Figure 13:
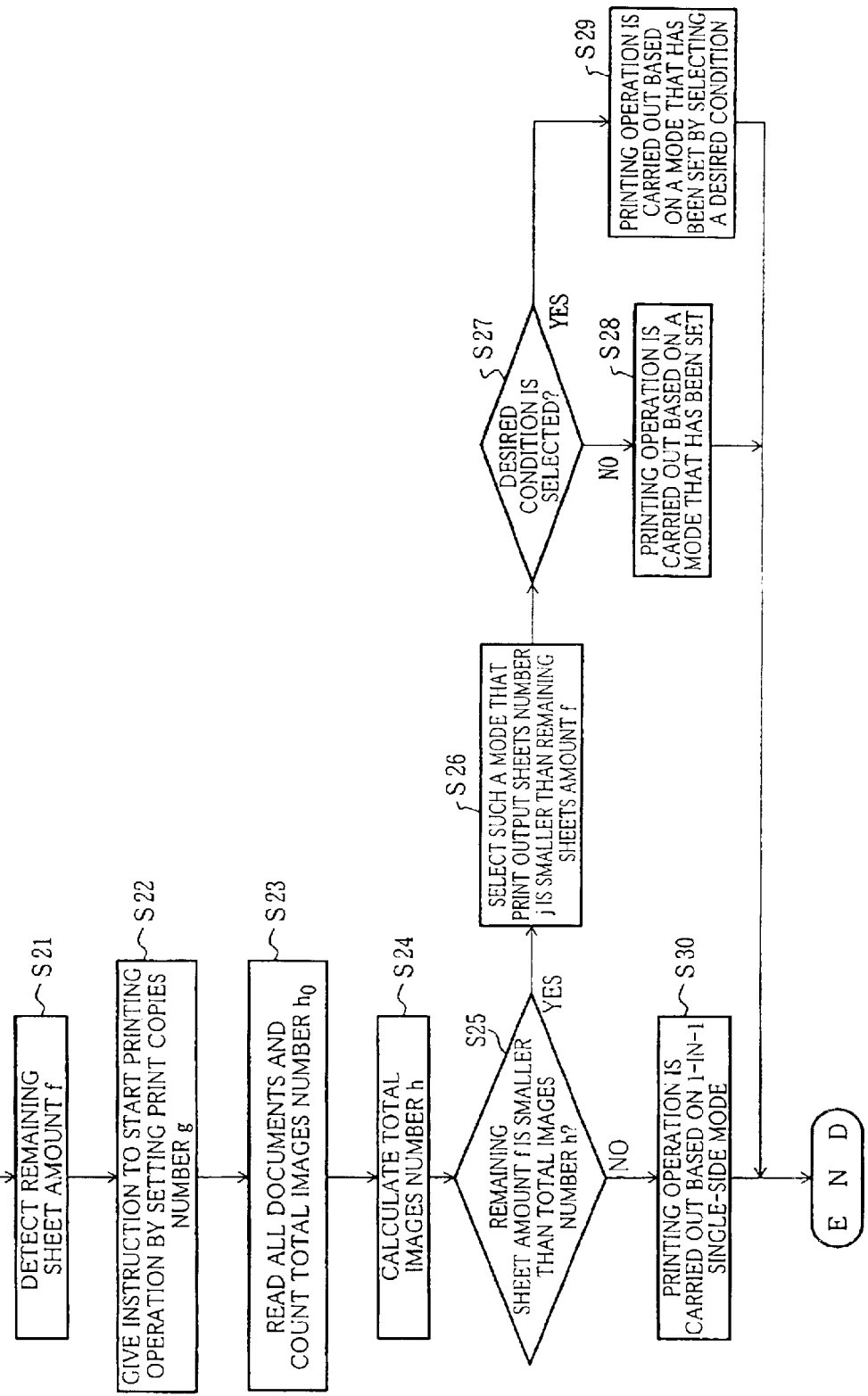
FIG. 13 shows another embodiment of the present invention, and is a flow chart showing a procedure of the printing condition setting method.
Figure 14:
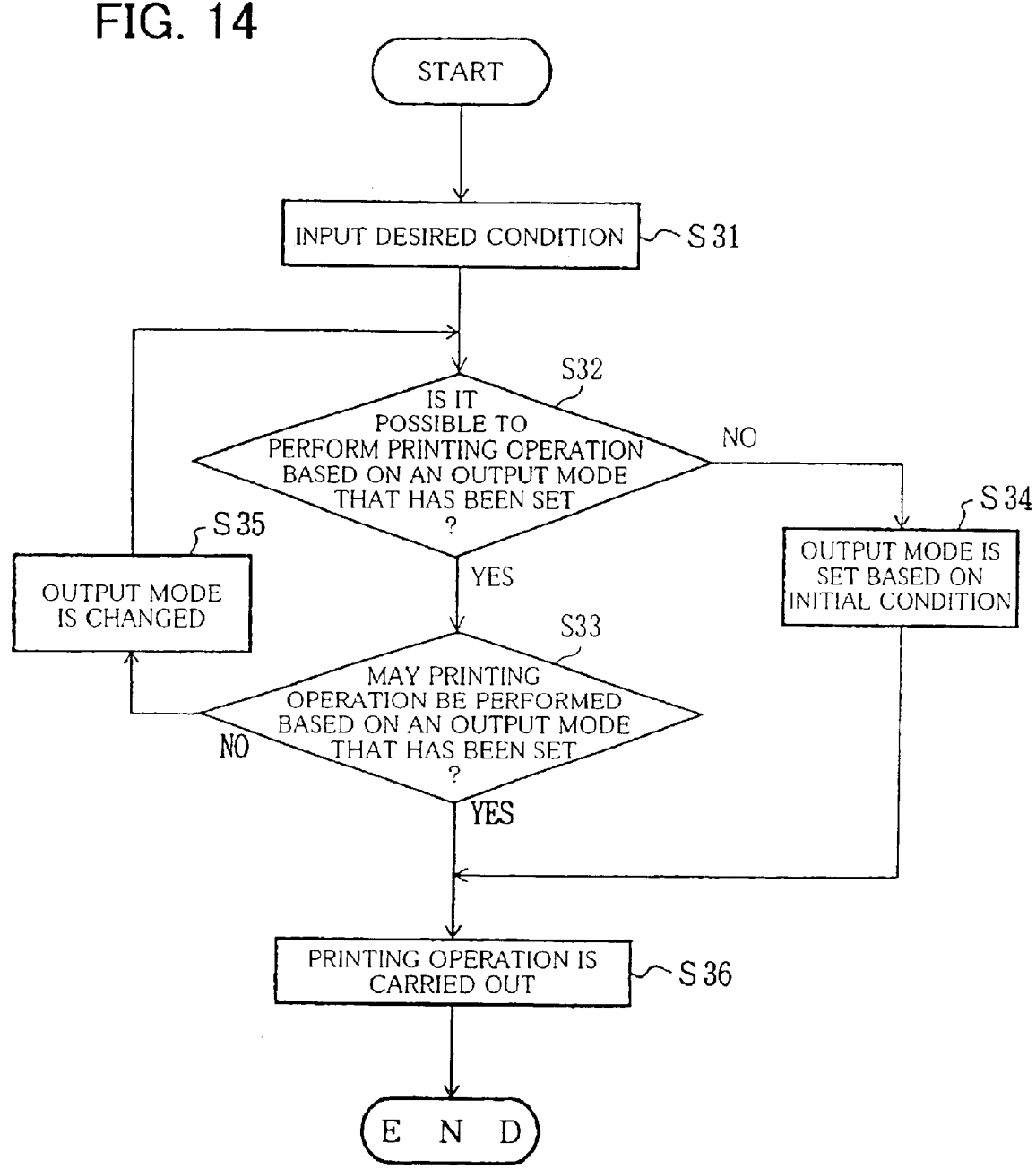
FIG. 14 is a flow chart showing a procedure of the printing condition setting method, and particularly, is a flow chart in a case where setting of an output mode is changed.

Further, it is more preferable that: in FIG. 13, steps of S28 and S29 are added while the step proceeding from S25 to S30. Thus, even in the case where the remaining sheet amount f is fewer than the total images number h, it is possible to set the output mode desired by the user. For example, when the user selects "Double-side printing is prioritized" as the condition desired by the user, the printing operation is carried out in accordance with the 1-in-1 double-side mode in S30.

The foregoing description discussed the remaining sheet amount of each of the sheet storing trays 21 to 23 as the condition concerning the allowable amount. As to other allowable amount, procedures performed until the printing condition is set are the same. That is, the remaining sheet amount f is replaced with the deliverable amount f of the delivery tray 55 for example.

Further, as to the limited output sheets number inputted by the user (limited output sheets number setting step), procedures performed until the printing condition is set are the same. That is, the remaining sheet amount f is replaced with the limited output sheets number f.

Further, also in the case where the allowable amount and the limited output sheets number are set together, procedures performed until the printing condition is set are basically the same. That is, by comparing (i) a condition indicating the fewest amount selected from the allowable amount and the limited output sheets number with (ii) the total images number h, the output mode is set.

Thus, the user does not have to confirm (i) the total number of unit images of original images and (ii) a condition of the image forming device every time, and it is possible to perform the printing operation while reducing the number of the output sheets. As a result, it is possible to improve the simplicity of the operation and to reduce the cost of the output sheets at the same time.

The following description will further detail the present embodiment by giving specific examples.

EXAMPLE 1

Description is given on a case where only the remaining sheet amount is used as the condition concerning the allowable amount. First, the image forming device (see FIG. 2) causes a remaining sheet amount detecting section to detect the remaining sheet amount f. Here, a detection result of f=500 is obtained (S21). Next, the user inputs the print copies number g to the image forming device (copies number setting step), and instructs the image forming device to begin the printing operation (S22). Here, g=10 is inputted.

Next, the automatic document transport device 31 transports the documents placed on the document setting tray 37 to the document placement table 32 one by one so that the documents are read by the document reading section 3. The read document image is stored in the memory 64 (see FIG. 3), and an images number of the original image is counted (S23).

Here, when a single image is read from each of 40 sheets which are documents, the total images number $h_o$ in printing only one copy of the original image corresponds to the number of document images, so that $h_o$=40. Further, the print copies number g=10, so that the total images number h is as follows: $h=h_o \times g=40 \times 10=400$.

Next, the total images number h and the remaining sheet amount f are compared with each other, so that the output mode is automatically selected. In the foregoing case, h=400 and f=500, so that h<f. Thus, this is within a range of the allowable amount, so that the printing operation is carried out in accordance with an ordinary mode (1-in-1 single-side mode) (S30).

EXAMPLE 2

Description is given on a case where only the remaining sheet amount is used as the condition concerning the allowable capacity. Except that the remaining sheet amount f=150 is detected and the total images number h=400 is calculated, the steps S21 to S24 are performed as in Example 1.

In this case, when the total images number h and the remaining sheet amount f are compared with each other, h=400 and f=250, so that h>f (S25). The remaining sheet amount f is less than the total images number h, so that the total images number h exceeds the allowable amount. Then, the output mode is selected (S26). $h \div f=400 \div 250=1.6<2$. That is, in a case of performing the printing operation so that the total images number h does not exceed the remaining sheet amount f=250, it is necessary to select the output mode for printing two pages on each output sheet (distribution number P=2). That is, for example, the 1-in-1 double-side mode or the 2-in-1 single-side mode is selected (printing condition setting step), so as to carry out the printing operation (S28 or S29). Further, the 1-in-1 double-side mode or the 2-in-1 single-side mode is selected in accordance with the priority level of the output modes predefined in the image forming device, so as to carry out the printing operation.

EXAMPLE 3

Description is given on a case where only the remaining sheet amount is used as the condition concerning the allowable capacity. Except that the remaining sheet amount f=200 is detected and the total images number h=400 is calculated, the steps S21 to S24 are performed as in Example 1.

Further, the image forming device has functions of an N-in-1 single side mode and an N-in-1 double-side mode (N=integer number of 1 to 10) as the output modes of the image forming device. Further, as shown in FIG. 8, the conditions desired by the user are inputted so that "double-side printing is forbidden" and "image size is prioritized" are selected.

First, when the total images number h and the remaining sheet amount f are compared with each other, h=400 and f=200, so that h>f (S25). The remaining sheet amount f is less than the total images number h, so that the total images number h exceeds the allowable amount. Then, the output mode is selected (S26). h÷f=400÷200=2. That is, the output mode for printing two pages on each output sheet (distribution number P=2) is selected. That is, in S26, a 1-in-1 double-side mode, an N-in-1 (N=2 to 10) single-side mode, and an N-in-1 double-side mode are selected.

Here, the user selects "double-side printing is forbidden" and "image size is prioritized" as the desired conditions, so that not the double-side mode but the single-side mode is set as the output mode. That is, a 2-in-1 single-side mode is set. Further the printing operation is carried out (S29).

Note that, it is more preferable to add the steps S27, S28, and S29 while proceeding from S25 to S30. Thus, even in the case where the remaining sheet amount f is less than the total images number h, it is possible to set the output mode desired by the user. For example, when the user selects "double-side printing is forbidden" and "image size is prioritized" as the desired conditions, the printing operation is carried out in accordance with a 2-in-1 single-side mode in S30.

EXAMPLE 4

Description is given on a case where only the remaining sheet amount is used as the condition concerning the allowable amount. Except that the remaining sheet amount f=100 is detected and the total images number h=400 is calculated, the steps S21 to S24 are performed as in Example 1.

Further, the image forming device has functions of a 1-in-1 single-side mode, a 1-in-1 double-side mode, a 2-in-1 single-side mode, a 2-in-1 double-side mode, and a 4-in-1 single-side mode as the output modes of the image forming device. Further, a 1-in-1 single-side mode is set in the image forming device as an output mode of an initial condition.

In the printing condition setting step, the total images number h and the remaining sheet amount f are compared with each other so that the output mode is automatically selected. When h=400 and f=100, h>f (S25). The remaining sheet amount f is less than the total images number h, so that the total images number h exceeds the allowable amount. Then, the output mode is selected (S26). h÷f=400÷100=4. That is, the output mode for printing four pages on each output sheet (distribution number P=4) is selected. That is, in S26, a 4-in-1 single-side mode and a 2-in-1 double-side mode are selected in the case of the image forming device of the present embodiment.

Here, selectable output modes are displayed in the operation panel provided on the operation section of the image forming device (S32). For example, as shown by the display image 201 of FIG. 15, "Single-side copy of 4-in-1 is performed (4-in-1 single-side mode) O.K.?" is displayed (S33, printing condition confirming step). When the user selects "Yes", the printing operation is carried out in accordance with the output mode (S36). When the user selects "No", the output mode is changed to another output mode of a different pattern (S35).

Next, the image forming device of the present embodiment performs the printing operation in accordance with the output mode for printing four pages on each output sheet (distribution number P=4) and has a function of a 2-in-1 double-side mode, so that the step proceeds to S33 (S32). For example, as shown by the display image 202 of FIG. 15, "Double-side copy of 2-in-1 is performed (2-in-1 double-side mode) O.K.?" is displayed (S33). When the user selects "Yes", the printing operation is carried out in accordance with the output mode (S36).

Here, when the user selects "No", the image forming device of the present embodiment does not have any other output mode for printing four pages on each output sheet (distribution number P=4). Then, when there is no other output mode, as shown by the display image 203 of FIG. 15, "Ordinary copy (1-in-1 single-side mode) is performed." is displayed (S34). Further, the printing operation is carried out in accordance with an output mode that has been initially set, that is, a 1-in-1 single-side mode (S36).

Further, it is preferable to select the condition desired by the user in advance before setting the output mode as shown in S37 (desired condition inputting step). For example, when the user selects "double-side printing is prioritized" as the desired condition, the 4-in-1 single-side mode is not selected in the present example. That is, it is not necessary to perform the operation required in the display image 201 of FIG. 15, thereby further improving the operability of the image forming device.

EXAMPLE 5

Example 5 is different from Example 4 in that: the image forming device does not have the printing condition, that is automatically set in the printing condition setting step, as a function of the image forming device.

In S21 to S24 of FIG. 13, let us suppose that the remaining sheet amount=50 is detected and the total images number h=400 is calculated. Further, the image forming device has functions of a 1-in-1 single-side mode, a 1-in-1 double-side mode, a 2-in-1 single-side mode, and a 2-in-1 double-side mode as the output modes of the image forming device. Further, a 1-in-1 single-side mode is set in the image forming device as the output mode of the initial condition.

In the printing condition setting step, the total images number h and the remaining sheet amount f are compared with each other so that the output mode is automatically selected. h=400 and f=50, so that h>f (S25).

Then, when the output mode is automatically selected, 400÷50=8, so that it is necessary to set the output mode for printing right pages on a single output sheet (distribution number P=8). Thus, a 4 in-1 double-side mode or a 8-in-1 single-side mode is selected.

However, in the image forming device of the present example, only a 2-in-1 double-side mode for printing four pages on each output sheet (distribution number P=4) can be set (S32). In this case, the output mode that has been initially set, that is, a 1-in-1 single-side mode is set (S34), so as to carry out the printing operation (S36).

Further, at this time, it is preferable that: for example, in the printing condition setting step, the user is asked to confirm the condition so that re-supply of the output sheets or change of the output mode can be selected. That is, when the printing condition automatically set in the printing condition setting step does not satisfy the needs of the user, the re-supply of the output sheets and the change of the output mode can be selected, so that it is possible to perform the printing operation in accordance with the printing condition which further satisfies the needs of the user.

Further, it is preferable that: the condition desired by the user is set in advance before setting the output mode as shown in S31, and the output mode is set in accordance with the output condition in S34. For example, the user selects "few output sheets number (print output sheets number j)" as the output condition, a 2-in-1 double-side mode which minimizes the total images number h is set in the present example. That is, it is possible to carry out the printing operation in accordance with the printing condition which satisfies the needs of the user.

[Embodiment 3]

Another embodiment of the present invention is described as follows with reference to attached drawings. Note that, the present invention is not limited to this. Further, for the convenience in description, the same reference signs are given to members having the same functions as the members used in Embodiment 1, and description thereof is omitted.

The image forming device of the present embodiment controls setting of the printing condition in accordance with conditions such as (i) the total number of unit images of original images, (ii) the limited output sheets number, and (iii) the allowable amount, and performs the printing operation. Further, the printing condition setting method according to the present invention is a method for setting the printing condition in accordance with the respective conditions.

Note that, the conditions such as (i) the total number of unit images of original images, (ii) the limited output sheets number, and (iii) the allowable amount are the same as in Embodiment 2. However, in the present embodiment, the image forming device recognizes the allowable amount which is regarded as an amount of the output sheets which can be post-processed in the stapling process performed by the post-processing section (post-processing means) 4 (see FIG. 16), so as to set the output mode.

Figure 16:
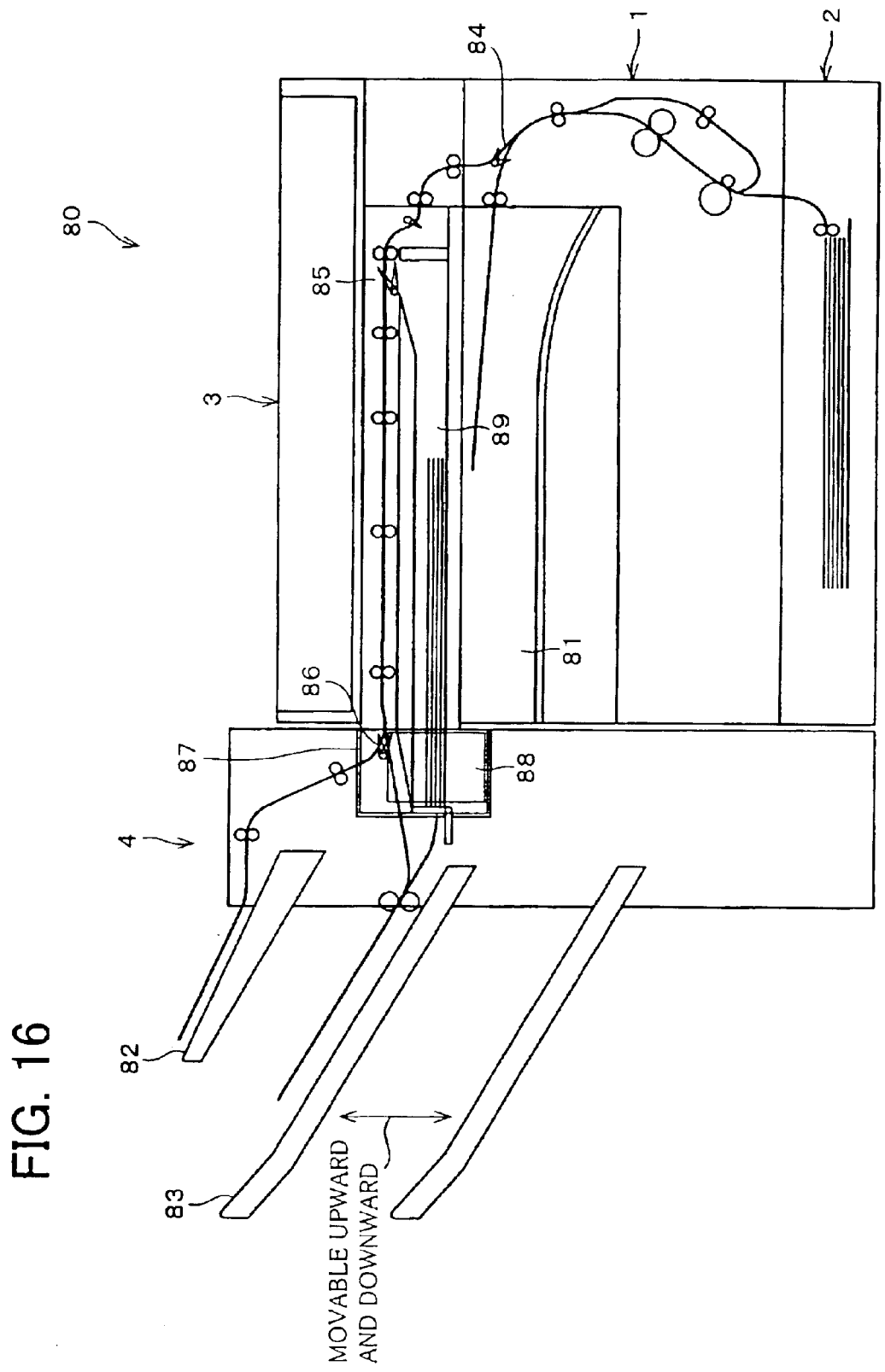
FIG. 16 shows another embodiment of the present invention, and is a schematic showing an arrangement of an image forming device which employs the printing condition setting method.

FIG. 16 schematically shows an arrangement of an image forming device 80 which is one embodiment of the present invention. Note that, the image forming device 80 merely shows an arrangement example of the present invention, so that the present invention is not limited to this. Further, a basic arrangement thereof is the same as the image forming device shown in FIG. 2. Thus, the same reference signs are given to members having the same functions as the member of the image forming device of FIG. 2, and description thereof is omitted.

The image forming device includes an image forming section 1, a sheet feeding section 2, a document reading section 3, and a post-processing section 4. The image forming device 80 includes delivery trays 81 and 82 as delivery trays (delivery means), and a delivery tray 83 used to perform the stapling process. The delivery tray 81 is provided on a main body of the image forming device 80, and the delivery tray 82 and the delivery tray 83 used to perform the stapling process are provided on the post-processing section 4. On a transport path of the output sheet, there are provided switching gates 84, 85, and 86 each of which transports the output sheet to each delivery tray.

The image forming device 80 uses a stapling device 87 (stapling means) as the post-processing section 4. The stapling device 87 includes a stapler 88 and a stapling tray 89 which can store a set of output sheets that have been printed. Specifically, after delivering a certain amount of printed output sheets to the stapling tray 89, end portions of the output sheets are stapled. Thereafter, an "output sheets bundle" obtained by stapling the end portions of the output sheets is delivered to the delivery tray 83 (delivery member). The delivery tray 83 can move up and down so that a large amount of delivered output sheets can be placed thereon.

Note that, an arrangement of the stapling device 87 is not limited to the arrangement shown in FIG. 16 as long as the stapling process can be performed. Further, the post-processing section 4 is not limited to the stapling device 87, but a punching device (not shown) (punching means), a sorting device (not shown) (sorting means) can be used as the post-processing section 4.

In the present invention, as a detection result given by the allowable amount detecting means, at least the allowable amount of the post-processing means (stapling device in the present embodiment) is detected. The following description discusses the control for setting the printing condition.

The printing condition setting method of the present embodiment includes four steps: a total images number calculating step of calculating a total number of unit images of original images; a printing condition setting step of setting the printing condition; a limited output sheets number setting step of setting the limited output sheets number; and an allowable amount detecting step of detecting a condition concerning an allowable amount. Further, in the printing condition setting step, the printing condition is set in accordance with (i) the total number of unit images of original images, (ii) the limited output sheets number that has been set, and (iii) the allowable amount that has been detected.

Specific arrangements of the steps are the same as in Embodiment 2, so that description thereof is omitted. Particularly, in the present invention, the condition concerning the allowable amount is an allowable amount of output sheets that are subjected to the post-process performed by the post-processing section 4. Further, means for detecting the allowable amount is the allowable amount detecting means. Specifically, the post-processing section 4 is the stapling device 87, so that the stapling device 87 functions as the allowable amount detecting means, and the condition concerning the detected allowable amount is the number of output sheets that can be stapled (post-processable amount).

In a general image forming device, it is often to use a standardized output sheet, such as PPC (Plane paper copy), manufactured so as to be uniformly standardized as the output sheet. Thus, in a case of printing the standardized output sheet, it is possible to fix the number of output sheets that can be stapled in accordance with types of the stapling device 87.

That is, in a case of using the most general standardized output sheet such as PPC, even when types of PPC slightly differ from each other depending on makers, this rarely brings about substantial change in the amount of output sheets that can be stapled (stapling-processable amount). Thus, as long as the stapling device 87 can staple up to 30 output sheets, this number can be regarded as a fixed value of the stapling-processable amount, so that it is not necessary to cause the detecting means to detect the stapling-processable amount every time. Likewise, in a case of using a printing medium other than the output sheet, i.e., an OHP (Overhead projector) sheet, or in a case of using thin paper and paper board, the stapling-processable amounts are set as fixed values.

In this case, it is possible not only to simplify the control process, but also to substantially omit the allowable amount detecting means when the image forming device is set so that only the standardized sheet is used.

Further, the printing condition setting method of the present embodiment includes a copies number setting step of setting a copies number of the original images, and in the total images number calculating step, the total number of unit images is calculated in accordance with (i) the print copies number that has been set and (ii) the original images number that have been inputted. This arrangement makes it easier to calculate the total number of unit images of original images as described in Embodiment 2. Thus, even in a case of printing a plurality of copies of the original images, a single entry of the original images enables the plurality of copies to be printed.

Particularly, in the case of the present embodiment, the stapling device 87 is used as the post-processing section 4, so that it is preferable to input the print copies number. That is, the stapling process is to staple a plurality of output sheets after collecting them into one set. Thus, as long as it is possible to input the print copies number, the user has only to input the number of copies of stapled output sheets desired by the user into the image forming device. This arrangement is convenience in terms of the operability of the image forming device.

Further, upon setting the condition concerning the allowable amount, it is possible to use at least one of or preferably both of (i) the remaining sheet detecting section for detecting an amount of sheets remaining in the sheet feeding section 2 and (ii) the deliverable amount detecting section for detecting a deliverable amount of output sheets, stored in the delivery trays 81 to 83, on which images have been formed.

That is, the image forming device is arranged so as to have the arrangement of Embodiment 1 and the arrangement of Embodiment 2, so that it is possible to set the printing condition in accordance with conditions and functions of the image forming device.

Note that, a specific example of the present embodiment is an arrangement in which the remaining sheet amount f of the Embodiment 2 is replaced with the stapling-processable amount (post-processable amount) f. Note that, when the stapling-processable amount f is less than the total number of unit images even though any output mode is used, that is, when it is impossible to perform the stapling process, the printing operation is carried out in accordance with merely the 1-in-1 single-side mode which corresponds to the initial condition of the image forming device. Alternatively, the printing operation is carried out in accordance with the printing condition desired by the user. This arrangement is made so that the user can perform the stapling process using another stapler after carrying out the printing operation.

Further, processes in the case where the punching means or the sorting means is used as the post-processing means are the same as the foregoing processes. That is, the remaining sheet amount f is replaced with a punching-processable amount (post-processable amount) f or a sorting-processable amount (post-processable amount) f.

Further, also in the image forming device having the arrangements of Embodiments 1 and 2, the same processes are performed until the basic printing condition is set. That is, by comparing (i) a condition indicating the fewest amount selected from the allowable amount and the limited output sheets number with (ii) the total number of unit images, the output mode is set.

Thus, it is possible to further improve the simplicity of the operation and to reduce the output sheet cost.

[Embodiment 4]

Another embodiment of the present invention is described as follows with reference to attached documents. Note that, the present invention is not limited to this. Further, for the convenience in description, the same reference signs are given to members having the same functions as the members used in Embodiment 1, and description thereof is omitted.

Figure 17:
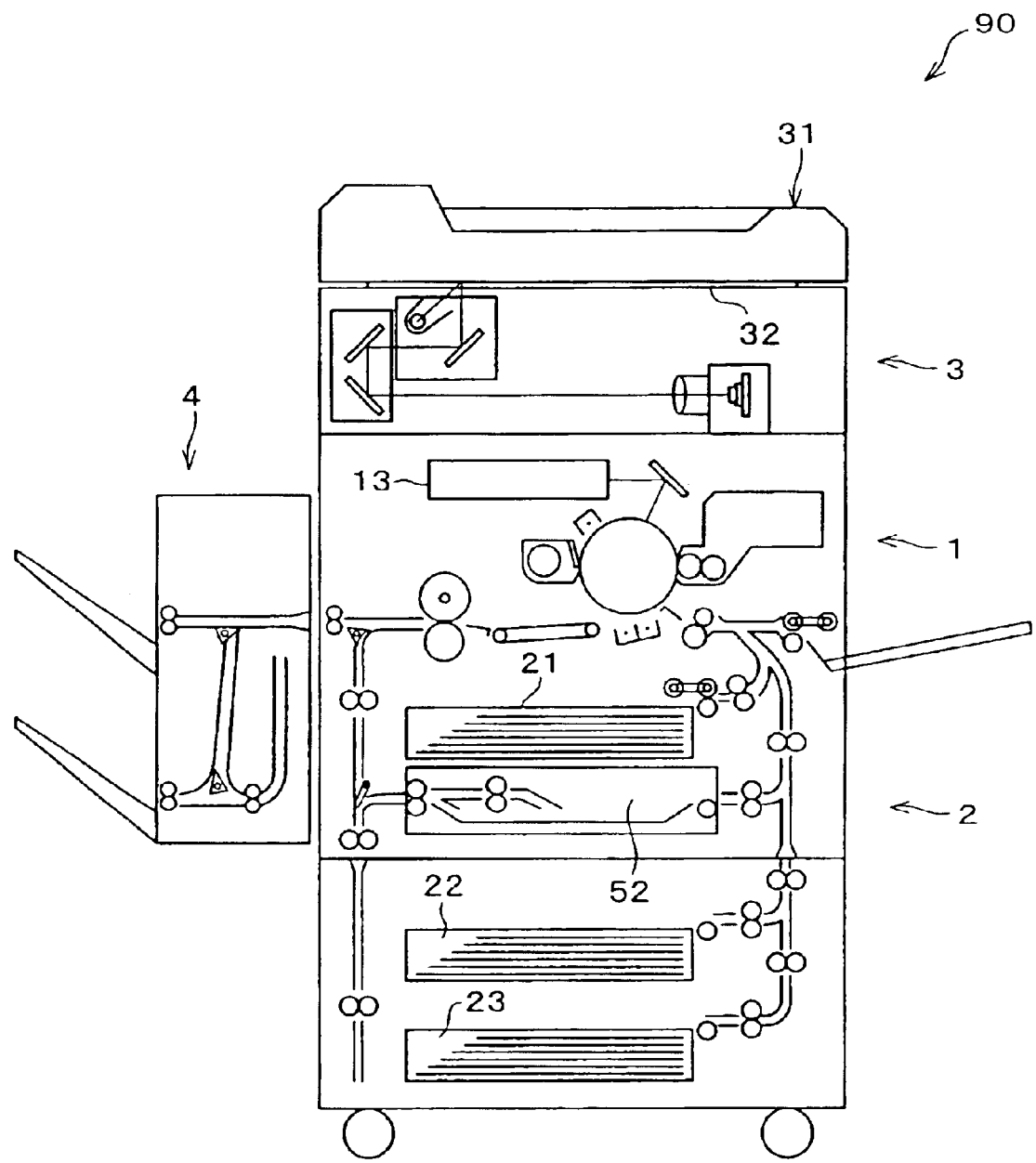
FIG. 17 shows another embodiment of the present invention, and is a schematic showing an arrangement of an image forming device which employs the printing condition setting method.

As another embodiment of the present invention, FIG. 17 schematically shows an arrangement of a digital copying machine (image forming device) 90. The digital copying machine 90 includes an image forming section 1, a sheet feeding section 2, a document reading section 3, and a post-processing section (post-processing means) 4. Sheet storing trays (sheet feeding means) 21 to 23 of the digital copying machine 90 are disposed up and down unlike the image forming device of FIG. 2. Further, also a double-side transport unit 52 is provided between the sheet storing trays 21 and 22. Note that, the digital copying machine 90 is a digital complex type image forming device which can perform three printing operations: a copying operation, a printing operation, and a facsimile operation.

Figure 18:
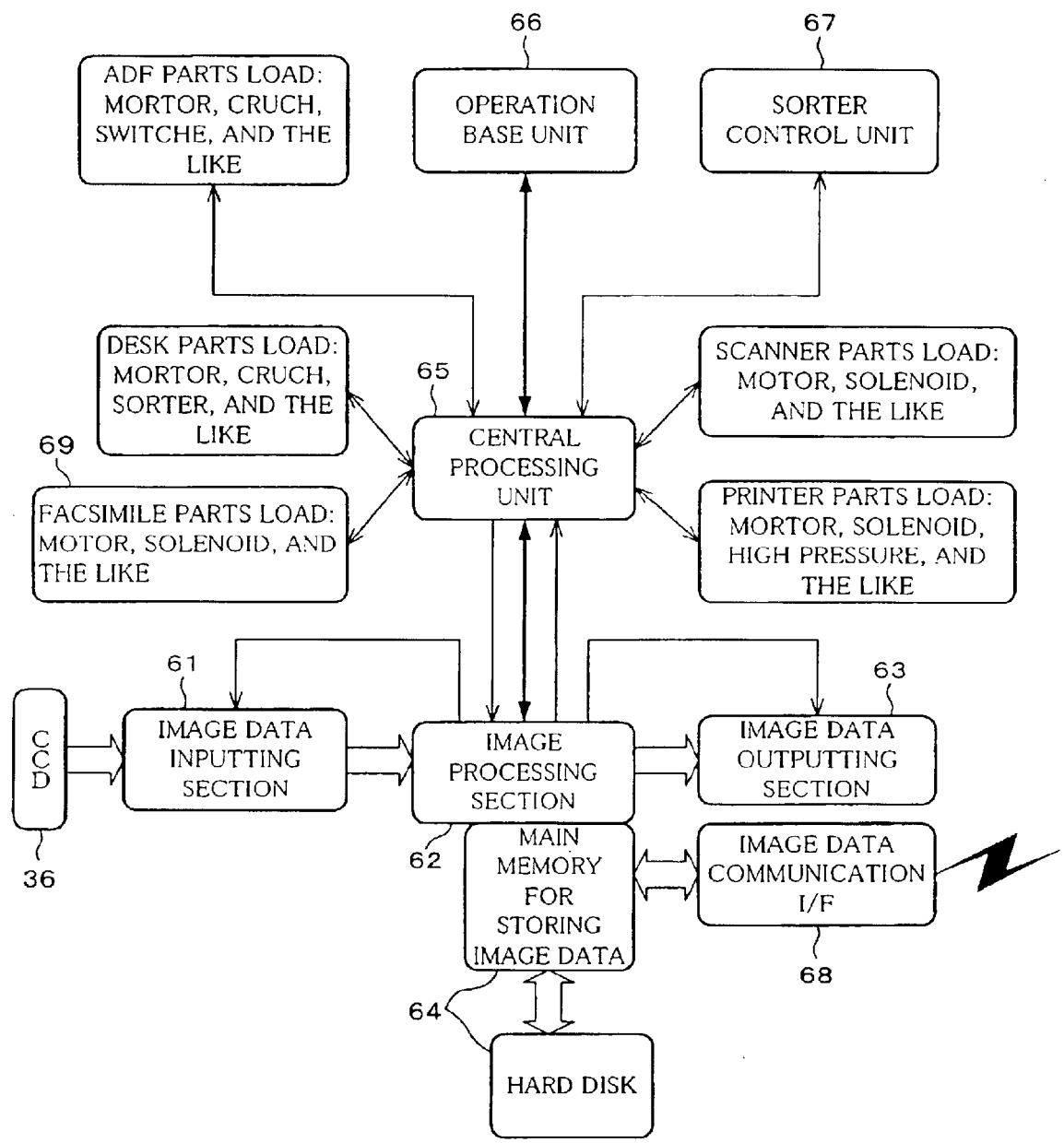
FIG. 18 is a block diagram showing an arrangement of a control section of an image forming device which employs the printing condition setting method.

FIG. 18 shows an arrangement of a control section of the digital copying machine 90. The digital copying machine 90 includes an image data inputting section 61, an image processing section 62, an image data outputting section 63, a memory 64, a central processing unit 65, an operation substrate unit 66, a sorter control unit 67, and an image data communication I/F 68.

Note that, an arrangement of each section is the same as the arrangement of the control section (see FIG. 3) of the image forming device of FIG. 2, so that detail description thereof is omitted. However, compared with the image forming device of FIG. 2, the digital copying machine 90 can perform the facsimile operation as the printing operation. Thus, a facsimile-related load 69 for performing the facsimile operation is added to the central processing unit 65 unlike the arrangement of FIG. 3. That is, the facsimile-related load 69 manages driving mechanisms such as a motor and a crutch by sequential control, and outputs a control signal for controlling them.

Next, the following description will discus the copying operation, the printing operation, and the facsimile operation of the digital copying machine.

First, the copying operation is described. Documents set in a predetermined position of an automatic document transport device 31 of the digital copying machine 90 are sequentially supplied to the document replacement table 32 of the document reading section 3 one by one. Further, images of the documents are sequentially read by the aforementioned arrangement of the document reading section 3, and are forwarded to the image processing section 62 as 8-bit electronic data.

The 8-bit electric data forwarded to the image processing section 62 is subjected to a predetermined process in the image data outputting section 63 as electric image data. Further, the 8-bit electric image data is subjected to a process such as gamma correction, and is sent to a light scanning unit 13. Thus, the document image read by the document reading section 3 of the digital copying machine 90 is outputted by the image forming section as a copy image having gray scales.

Next, an electric RHD function of the copying operation is described as follows. Documents set in a predetermined position of the automatic document transport device 31 of the digital copying machine 90 are sequentially supplied to the document replacement table 32 of the document reading section 3 one by one. Further, images of the documents are sequentially read by the aforementioned arrangement of the document reading section 3, and are forwarded to the image processing section 62 as 8-bit electric data. The 8-bit electric data forwarded to the image processing section 62 is subjected to a predetermined process in the image data outputting section 63 as electric image data.

Further, the 8-bit electric image data is converted into 2-bit electric image data as well as being subjected to a process such as error diffusion. Note that, a reason for which the 8-bit electric image data is converted into 2-bit electric image data as well as being subjected to a process such as error diffusion is as follows. When merely converting multivalued data into binary data, this brings about problems in the image quality, so that the foregoing process is performed so as to minimize deterioration of the image quality. Further, the 8-bit electric image data is converted into the 2-bit electric image data in terms of storage capacity of images.

The 2-bit electric image data obtained by the foregoing conversion is forwarded, by each document data, to the memory 64 such as a hard disk, and is temporarily stored and managed there.

When all the documents set in the automatic document transport device 31 of the digital copying machine 90 are read, the 2-bit electric image data temporarily stored in the memory 64 is repeatedly read so that the number of times repeated is the same as the number of copies that has been specified under the control of the gate array. Thereafter, the read 2-bit electric image data is subjected to a process such as gamma correction, and is then sent to the light scanning unit 13.

Note that, in the foregoing description, all the original images are repeatedly read so that the number of times repeated corresponds to the number desired by the user, but it may be so arranged that the first copy is outputted after a predetermined amount of images are prepared.

Thus, the document image read by the document reading section 3 of the digital copying machine 90 is outputted as a copy image having gray scales from the image forming device 1.

Next, the printing operation is described as follows. An image sent from an external device such as a PC (Personal computer) connected via a network is developed in a printer board (not shown) of the image processing section 62 as each page image. Thereafter, the image is temporarily stored in the memory 64.

Note that, the image developed in the printer board as the page image is temporarily stored in the memory 64 without being subjected to the binary image process. Further, also when the temporarily stored page image is read out from the memory 64, the page image is not subjected to the binary image process.

Further, the image information temporarily stored in the memory 64 is sent to the image processing section 62 while being read out from the memory 64 so that pages are in a predetermined order, and is then subjected to the gamma correction, and writing of the image is controlled so that the image is reproduced in the image data outputting section 63.

Next, the facsimile operation is described as follows. The facsimile operation includes a sending process for sending a document to a receiving end and a receiving process for receiving the document sent from the sending end.

First, description is given on the case where the document is sent to the receiving end. Documents to be sent that have been set in a predetermined position of the automatic document transport device 31 of the digital copying machine 90 are sequentially transported to the document placement table 32 of the document reading section 3 one by one, and the documents are sequentially read by the aforementioned arrangement of the document reading section 3, and the document data is forwarded to the image processing section 62 as 8-bit electric data.

The 8-bit electric data forwarded to the image processing section 62 is subjected to a predetermined process in the image data outputting section 63. Further, the 8-bit electric image data is converted into 2-bit electric image data as well as being subjected to error diffusion.

Note that, a reason for which the 8-bit electric image data is converted into 2-bit electric image data as well as being subjected to a process such as error diffusion is as follows.

When merely converting multivalued data into binary data, this brings about problems in the image quality, so that the foregoing process is performed so as to minimize deterioration of the image quality. The binary image of the documents processed in the foregoing manner is stored in the memory 64 after being compressed in a predetermined form.

Further, a procedure for sending the data to the receiving end is performed. When a condition which allows the data to be sent is obtained, the images of the documents to be sent that have been compressed in a predetermined form after being read out from the memory 64 are forwarded to a facsimile board (not shown) of the image processing section 62. In the facsimile board, the images are subjected to a necessary process such as change of the compression form. Thereafter, the images are sequentially sent to the receiving end via a communication line.

Next, description is given on the case where the document images sent from the sending end are processed. When the documents are sent from the sending end via the communications line, the documents images sent from the sending end are received while performing a communication procedure by the facsimile board, and the received images compressed in a predetermined form are sent to the image processing section 62. Thereafter, the document images sent as page images processed by a compressed-data expanding section (not shown) are reproduced.

Further, the document image reproduced as each page image is forwarded to the image processing section 62 and is subjected to the gamma correction. Thereafter, writing of the image is controlled so that the image is reproduced by the image data outputting section 63.

It is possible to apply the present invention also to the digital copying machine as described above. That is, applicability of the printing condition setting method of the present invention does not depend on arrangements of the image forming device. That is, whether or not it is possible to carry out the printing operation in accordance with the set printing condition is determined, and when it is impossible to carry out the printing operation in accordance with the printing condition, the printing operation is carried out in accordance with the initial condition, so that it is possible to set a printing condition with respect to various image forming devices.

[Embodiment 5]

Another embodiment of the present invention is described as follows. Note that, the present invention is not limited to this.

The printing condition setting methods of the respective embodiments are realized by a program causing a printing condition setting process to function. The program is stored in a computer-readable storage medium. In the present invention, the following storage media are used: a memory such as a ROM (Read only memory), required in causing a microcomputer (not shown) to perform processes, which functions as a program medium; or a program medium which can be read by inserting it into a program reading device provided as an external storage device (not shown).

In each of the cases, it may be so arranged that a microprocessor accesses the stored program to carry out the program, or in each of the cases, it may be so arranged that: the program is read out, and the read program is downloaded to a program storage area of the microcomputer, and then the program is carried out. The program for download is stored in a main body of the image forming device in advance.

The program medium is a storage medium which is provided separable from the main body, and may be a medium which fixedly holds the program. Examples of the storage medium include tapes, such as magnetic tape and cassette tape; disks including magnetic disks, such as floppy disks and hard disk, and optical disks, such as CD-ROMs, MOs, MDs, DVDs, and CD-Rs; cards, such as IC card (including memory cards) and optical cards; and semiconductor memories, such as mask ROMs, EPROMs, EEPROMs, and flash ROMs.

Further, the system or device of the present invention may be adapted to be connectable to a communications network to feed the program over the communications network. Thus, the storage medium may be a medium which fluidly holds the program so that the program is downloaded from the communications network. Note that, in the case where the program is downloaded from the communications network in this manner, it may be so arranged that the program for download is stored in a main device in advance or the program for download is installed from another storage medium.

Note that, content stored in the storage medium is not limited to the program but may be data.

As described above, in the present invention, the printing condition is set by using the respective printing condition setting methods.

Therefore, in a case of printing image data corresponding to a plural pages within a predetermined number of output sheets fewer than the pages, when the required print sheets number and the print output sheets number are determined in the required print sheets number confirming step and the print output sheets number confirming step, the number of original images that should be printed on each output sheet is calculated in accordance with (i) the required print sheets number and (ii) the print output sheets number in the calculating step. Further, in accordance with the calculation result, the printing condition is set so that it is possible to print the original images corresponding to the required print sheets number on the output sheets corresponding to a number not more than the print output sheets number in the printing condition setting step.

Thus, when the user wants to print the image data of plural pages on the output sheets whose amount is not more than the number of the pages, the user does not have to perform such calculation that how many pages of the image data should be printed on each output sheet, thereby largely reducing operations in selecting the printing condition.

Alternatively, the total number of unit images of original images is calculated in the total images number calculating step, and the allowable amount of the output sheets is detected in the allowable amount detecting step, so that the printing condition is set in accordance with the total number of unit images that has been calculated and the allowable amount that has been detected.

Thus, upon printing a plurality of sheets, the user does not have to confirm the total number of unit images of original images and a condition of the image forming device every time. As a result, it is possible to improve the simplicity of the operation.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

According to the arrangement and the method of the present invention, in the case of outputting the image data corresponding to plural pages so as not to exceed the output sheets number less than the number of pages, it is possible to reduce operations that the user performs in setting the printing condition. Further, in printing a plurality of sheets, the user does not have to confirm the total number of unit images of original images and a condition of the image forming device every time.

Thus, it is possible to provide. (i) an image forming device which requires much fewer operations upon selecting the printing condition and (ii) an image forming device by which it is possible to improve the simplicity of the operations, for example, it is possible to provide a various kinds of printer and copying machine or a complex machine having two or more functions of a printer, a copying machine, a facsimile, and the like.

Further, when the method of the present invention is programmed so that an existing image forming device can read the program, it is possible to largely reduce operations upon selecting the printing condition of the image forming device and to improve the simplicity of the operation. Therefore, the method of the present invention is programmed and a computer-readable storage medium stores the program, so that it is also possible to provide the program as a software package and the like.

What is claimed is:

1. A printing condition setting method comprising:
   a required print sheets number confirming step of confirming a required print sheets number in original images;
   a print output sheets number recognizing step of recognizing a print output sheets number in output sheets wherein, in the print output sheets number recognizing step, a number of the output sheets remaining in sheet feeding means of the image forming device is confirmed, and thus confirmed number of the output sheets remaining in the sheet feeding means is recognized as the print output sheets number;
   a calculating step of calculating a number of the original images that should be printed on each output sheet in printing the original images of the required print sheets number on the output sheets so as not to exceed the print output sheets number; and
   a printing condition setting step of setting one or more printing conditions, each of which allows the original images of the required print sheets number to be printed on the output sheets so as not to exceed the printing output sheets number, in accordance with a calculation result obtained in the calculating step.

2. A printing condition setting method comprising:
   a required print sheets number confirming step of confirming a required print sheets number in original images;
   a print output sheets number recognizing step of recognizing a print output sheets number in output sheets;
   a calculating step of calculating a number of the original images that should be printed on each output sheet in printing the original images of the required print sheets number on the output sheets so as not to exceed the print output sheets number; and
   a printing condition setting step of setting one or more printing conditions, each of which allows the original images of the required print sheets number to be printed on the output sheets so as not to exceed the printing output sheets number, in accordance with a calculation result obtained in the calculating step wherein, in the printing condition setting step, when there are a plurality of the printing conditions that can be selected, the printing conditions are displayed so that the user can make a selection from the printing conditions so as to input thus selected one.

3. A printing condition setting method comprising:

a required print sheets number confirming step of confirming a required print sheets number in original images;

a print output sheets number recognizing step of recognizing a print output sheets number in output sheets;

a calculating step of calculating a number of the original images that should be printed on each output sheet in printing the original images of the required print sheets number on the output sheets so as not to exceed the print output sheets number; and a printing condition setting step of setting one or more printing conditions, each of which allows the original images of the required print sheets number to be printed on the output sheets so as not to exceed the printing output sheets number, in accordance with a calculation result obtained in the calculating step wherein, in the printing condition setting step, when there are a plurality of the printing conditions that can be selected, one of the printing conditions is set in accordance with a priority condition that has been set in advance.

4. A printing condition setting method comprising:

a required print sheets number confirming step of confirming a required print sheets number in original images;

a print output sheets number recognizing step of recognizing a print output sheets number in output sheets;

a calculating step of calculating a number of the original images that should be printed on each output sheet in printing the original images of the required print sheets number on the output sheets so as not to exceed the print output sheets number; and a printing condition setting step of setting one or more printing conditions, each of which allows the original images of the required print sheets number to be printed on the output sheets so as not to exceed the printing output sheets number, in accordance with a calculation result obtained in the calculating step wherein, in the printing condition setting step, when there is no printing condition which allows the original images of the required print sheets number to be printed on the output sheets so as not to exceed the print output sheets number, one of the printing conditions which minimizes the print output sheets number is displayed so that the user can determine whether or not to cancel a printing operation so as to input the determination.

5. A printing condition setting method comprising:

a required print sheets number confirming step of confirming a required print sheets number in original images;

a print output sheets number recognizing step of recognizing a print output sheets number in output sheets;

a calculating step of calculating a number of the original images that should be printed on each output sheet in printing the original images of the required print sheets number on the output sheets so as not to exceed the print output sheets number; and a printing condition setting step of setting one or more printing conditions, each of which allows the original images of the required print sheets number to be printed on the output sheets so as not to exceed the printing output sheets number, in accordance with a calculation result obtained in the calculating step wherein, when a stapling process is selected in the image forming device, a maximum number of the output sheets stapled in performing the stapling process is set as the print output sheets number set in the print output sheets number recognizing step.

6. A printing condition setting method comprising:

a required print sheets number confirming step of confirming a required print sheets number in original images;

a print output sheets number recognizing step of recognizing a print output sheets number in output sheets; an output copies number recognizing step of recognizing an output copies number;

a calculating step of calculating a number of the original images, that should be printed on each output sheet in printing the original images of the required print sheets number on the output sheets so as not to exceed the print output sheets number, in consideration for the output copies number; and a printing condition setting step of setting one or more printing conditions, each of which allows the original images of the required print sheets number to be printed on the output sheets so as not to exceed the print output sheets number, in accordance with a calculation result obtained in the calculating step.

7. The method as set forth in claim 6, wherein, in the printing condition setting step, when there are a plurality of the printing conditions that can be selected, the printing conditions are displayed so that the user can make a selection from the printing conditions so as to input thus selected one.

8. The method as set forth in claim 6, wherein, in the printing condition setting step, when there are a plurality of the printing conditions that can be selected, one of the printing conditions is set in accordance with a priority condition that has been set in advance.

9. The method as set forth in claim 6, wherein, in the printing condition setting step, when there is no printing condition which allows the original images of the required print sheets number to be printed on the output sheets so as not to exceed the printing output sheets number, one of the printing conditions which minimizes the print output sheets number is displayed so that the user can determine whether or not to cancel a printing operation so as to input the determination.

10. A printing condition setting method comprising:

a total images number calculating step of calculating a total number of unit images, corresponding to image data which should be printed on each output sheet, in accordance with at least original images that have been inputted;

a printing condition setting step of selecting a distribution number which is a number of the unit images printed on each output sheet so as to set a printing condition; and an allowable amount detecting step of detecting a condition concerning an allowable amount of output sheets which are allowed to be outputted in a single printing operation performed by an image forming device, wherein in the printing condition setting step, the printing condition is set in accordance with at least (i) the total number of the unit images that has been calculated and (ii) the allowable amount that has been detected.

11. The method as set forth in claim 10, wherein, in the total images number calculating step, the original images are temporarily stored in storage means.

12. The method as set forth in claim 10, further comprising a print copies number setting step of setting a print copies number of the original images, wherein in the total images number calculating step, the total number of the unit images is calculated in accordance with at least (i) the original images that have been inputted and (ii) the print copies number that has been set.

13. The method as set forth in claim 10, wherein in the allowable amount detecting step, at least any one of (i) an amount of the output sheets remaining in sheet feeding means of an image forming device, (ii) an amount of the output sheets that can be delivered by delivery means which delivers the output sheet that have been printed, and (iii) an amount of the output sheets that can be post-processed by post-processing means which post-processes the output sheets that have been printed, is detected as the condition concerning the allowable amount.

14. The method as set forth in claim 13, wherein the post-processing means includes any one of (i) stapling means for performing a stapling process, (ii) punching means for performing a punching process, and (iii) sorting means for performing a sorting process.

15. The method as set forth in claim 13, wherein, when the output sheets to be printed are standardized output sheets that have been uniformly standardized, the amount of the output sheet than can be post-processed is fixed in accordance with a type of the post-processing means.

16. The method as set forth in claim 10, further comprising a limited output sheets number setting step of setting a limited output sheets number in printing the original images, wherein in the printing condition setting step, the printing condition is set in accordance with at least (i) the total number of the unit images that has been calculated, (ii) the allowable amount that has been detected, and (iii) the limited output sheets number that has been set.

17. The method as set forth in claim 10 wherein, in the printing condition setting step, a plurality of formation layouts are prepared set so that the unit images are disposed in each output sheet in accordance with the distribution number of the unit images that has been selected.

18. The method as set forth in claim 17, wherein, in the printing condition setting step, combinations each of which is constituted of (i) the distribution number of the unit images and (ii) each of the formation layouts are recognized as output modes, and the printing condition is set by selecting one from the output modes.

19. The method as set forth in claim 10, wherein, in the printing condition setting step, whether or not it is possible to carry out a printing operation in accordance with the printing condition that has been set is determined, and when it is impossible to carry out the printing operation in accordance with the printing condition that has been set, the printing condition is carried out in accordance with a predetermined printing condition.

20. The method as set forth in claim 10 further comprising a desired condition inputting step of inputting a printing condition desired by the user, wherein in the printing condition setting step, the printing condition desired by the user is preferentially set.

21. The method as set forth in claim 10 further comprising a printing condition confirming step of (i) causing display means to display the printing condition that has been set in the printing condition setting step and (ii) performing an inputting operation so as to cause inputting means to change the printing condition to another printing condition.

22. An image forming device, setting a printing condition by using a printing condition setting method, wherein the printing condition setting method includes:

a required print sheets number confirming step of confirming a required print sheets number in original images; a print output sheets number recognizing step of recognizing a print output sheets number in output sheets;

an output copies number recognizing step of recognizing an output copies number;

a calculating step of calculating a number of the original images, that should be printed on each output sheet in printing the original images of the required print sheets number on the output sheets so as not to exceed the print output sheets number, in consideration for the output copies number; and a printing condition setting step of setting one or more printing conditions, each of which allows the original images of the required print sheets number to be printed on the output sheets so as not to exceed the print output sheets number, in accordance with a calculation result obtained in the calculating step.

23. An image forming device, setting a printing condition by using a printing condition setting method, wherein the printing condition setting method includes:

a total images number calculating step of calculating a total number of unit images, corresponding to image data which should be printed on each output sheet, in accordance with at least original images that have been inputted;

a printing condition setting step of selecting a distribution number which is a number of the unit images printed on each output sheet so as to set a printing condition; and an allowable amount detecting step of detecting a condition concerning an allowable amount of output sheets which are allowed to be outputted in a single printing operation performed by an image forming device, wherein in the printing condition setting step, the printing condition is set in accordance with at least (i) the total number of the unit images that has been calculated and (ii) the allowable amount that has been detected.

* * * * *